United States Patent [19]
Austin et al.

[11] Patent Number: 5,500,934
[45] Date of Patent: Mar. 19, 1996

[54] DISPLAY AND CONTROL SYSTEM FOR CONFIGURING AND MONITORING A COMPLEX SYSTEM

[75] Inventors: Jon O. Austin, Cary; Jani G. Byrne, Apex; Carole A. Bohn, Raleigh, all of N.C.; Arlindo Chiavegatto, Jr., Campinas-SP, Brazil; Jeffrey L. Smith; Raymond L. Zeisz, Jr., both of Raleigh, N.C.

[73] Assignee: International Business Machines Corporation, Armonk, N.Y.

[21] Appl. No.: 317,423

[22] Filed: Oct. 4, 1994

Related U.S. Application Data

[63] Continuation of Ser. No. 754,772, Sep. 4, 1991, abandoned.

[51] Int. Cl.$^6$ .................................................... G06F 3/14
[52] U.S. Cl. ............................................ 395/755; 395/159
[58] Field of Search ................................. 395/155–161

[56] References Cited

U.S. PATENT DOCUMENTS

| | | | |
|---|---|---|---|
| 5,117,372 | 5/1992 | Petty | 395/161 |
| 5,136,690 | 8/1992 | Becker et al. | 395/161 |
| 5,226,120 | 7/1993 | Brown et al. | 395/200 |
| 5,295,244 | 3/1994 | Dev et al. | 395/160 |
| 5,349,674 | 3/1995 | Calvert et al. | 395/800 |

*Primary Examiner*—Mark R. Powell
*Assistant Examiner*—Huynh Ba
*Attorney, Agent, or Firm*—Stephen T. Keohane

[57] ABSTRACT

A display and control system utilizes graphics for providing a clear, concise and intuitive interface between the user and a complex system. Icons are utilized for selectively representing components of the complex system, the components having a configurable relationship with one another. The display and control system further utilizes a predefined array defining locations for the icons to be positioned. In a first embodiment, the interface may be utilized in a network for assisting the user to configure the network and for providing real-time monitoring of the network at the interconnect device. In a second embodiment, a display and control system utilizes graphics for providing a clear, concise interface between the user and a workstation for configuring a file for use with an application software program in accordance with the hardware installed in the server workstation. Each embodiment utilizes a predefined array defining locations for the icons to be positioned.

20 Claims, 19 Drawing Sheets

DISPLAY AND CONTROL SYSTEM FOR CONFIGURING AND MONITORING A COMPLEX SYSTEM

This is a continuation of application Ser. No. 07/754,772, filed on Sep. 4, 1991, now abandoned.

BACKGROUND OF THE INVENTION

1. Field of the Invention

This invention relates to interactive displays for interfacing with users and, more particularly, to a graphical user interface, display and control system for configuring and monitoring a complex system having a number of interrelated components, such as a local or a wide area network.

2. Prior Art

In data communications, a local area network (LAN) is a high-speed communications network that operates over a limited geographical area, typically an office building or a college campus. The use of LANs is becoming increasingly popular because they provide the computer user with the opportunity to communicate with other workers, to supply and access data, and to share expensive peripherals, hard-disk storage devices, sophisticated printers, etc.

With individual LAN islands continuing to proliferate among multiple corporate locations, the need to interconnect them has become increasingly apparent. Often, the connectivity vehicle is a wide area network (WAN).

WANs are communications networks that operate over wide geographical areas. Although WANs share some similarities with LANs, WANs differ from LANs in terms of raw speed and distance; that is, LANs support transmission rates of 1 to 100 Mb/s and higher over relatively short distances, while today's WAN technology is capable of supporting worldwide transmission at rates that are orders of magnitude less.

Internetworking of LANs is normally accomplished through the use of devices such as bridges, routers, or gateways, depending upon which layer of the seven-layer OSI reference model the data transfer is to occur. In addition, IBM's LAN to LAN Wide Area Network program (LTLW) enables a station using the IBM NETBIOS protocol on one LAN to communicate with a station using the IBM NETBIOS protocol on another LAN by sending the frames across a WAN that connects the two LANs. IBM's LTLW program is described in greater detail in the IBM LAN To LAN Wide Area Network Program User's Guide (1st Edition).

The evolution of larger and faster LAN configurations has resulted in the need for interconnecting LANs from various locations to make even larger LAN networks. As the population of interconnected LANs grows, however, the management of the subnetworks of interconnected LANs becomes much more complex and confusing to the network manager or node user. Thus, it is especially important for the interface between the computer and the user to be easy to learn and understand so that it promotes error-free performance and user satisfaction with the system.

At present, three styles of information presentation are utilized for interfacing with the computer user: (1) text presentation; (2) menus; and (3) graphics. The first style, text presentation, focuses on users whose interactions with a computer involve reading or searching through files of text. The display of written text on computer screens poses some problems for the user. For instance, computer screens are generally harder to read than paper. Furthermore, since the computer is not a book, the user does not have physical-location cues, i.e., there is no sense of how long an article is, or where the reader is, in the context of the article or program. In addition, physical configurations, such as LAN to LAN interconnection configurations or computer hardware configurations, are difficult to portray in text.

The second style of information presentation, the menu-driven display, remains the prototypical form of information presentation for novice users of computers. Because selecting items from menus eliminates the need to memorize computer commands and syntax, having choices presented as selectable items from a menu is especially helpful to users who are unfamiliar with the applications or with computer languages. However, the use of the menu-driven program, especially for the knowledgeable user, can result in scrolling through numerous, unnecessary menus before the menu with the appropriate selectable items appears. This is time-consuming and frustrating. Also, as with text presentation, physical configurations are difficult to portray via menus.

The graphical interface is typically used either to conduct a dialog with the computer or to display data. A graphical user dialog with the computer can occur by the direct manipulation of icons. The graphical representation is effective as it is easy to use and provides continuous direct feedback to the user that reflects the actions being taken. With direct manipulation, actions are rapid, immediately visible and easily reversible. In addition, icons are generally more informative and easier to manipulate in a graphical environment than verbal labels for objects.

In LAN management systems, each of the three styles of information presentation have been utilized, the graphical interface being the most effective. For example, Hewlett Packard utilizes a topological map of a network for providing the status of each network element in its OpenView and Node Manager application. The OpenView and Node Manager utilizes free-form graphics for representing each node in the network and its various interconnections with the remaining nodes in the network. The representation of each network element may be positioned anywhere on the computer screen by the user and, at any time, be selected for a display of the element's network interconnect status. IBM's LAN Network Manager employs a similar free-form graphical representation of the network for monitoring purposes.

These types of graphics are especially effective in monitoring the complex variables and relationships between the various LANs in the network. However, the graphics interfaces provided by each of these programs provide a topological map of the network, each network element being selectively positioned about the computer screen by the user. The interfaces provide a graphical representation of the network as a whole without focusing on a particular element or node in the network. The connections between each of the network nodes to the other network nodes is shown on the display. Quite clearly, as the particular network being monitored or configured grows, the clarity of the graphical interface becomes more obscure as network connections begin to appear to run together. This can be quite confusing to an unsophisticated user whose sole desire is to monitor the network status of his own terminal.

Furthermore, because these types of programs utilize free-form graphics, or graphics in which the icons representing the network nodes, for instance, are selectively positioned by the user anywhere on the display, much processor time is consumed. As a result, the device monitoring the activities of the network is limited as to the number of additional functions it can perform. In the present examples, the Hewlett Packard OpenView and Node Manager and the IBM LAN Network Manager programs are utilized in devices whose sole function is configuring and/or monitoring the network. In particular, the network management device running the Hewlett Packard OpenView and Node Manager or the IBM LAN Network Manager program is connected to one of the LANs, in a manner similar to any of the LAN's stations, and acts to configure the network and to monitor the network's activities. Because of the processor time involved in presenting the free-form graphical interface, the network management device cannot provide additional functions to the network. For example, the network management device cannot, in addition, function as an interconnect device between the associated LAN and the WAN because the interconnect device requires substantial processor time to interface the LAN and WAN protocols.

Present graphics interfaces are inadequate in other areas as well. For example, in order to operate a software package with a particular workstation, it may be necessary to prepare a configuration program in accordance with hardware installed in the workstation. An example of this is IBM's Local Area Network Asynchronous Connection Server Version 2.0 (LANACS 2.0) software package.

In order to utilize such a program, it is necessary to configure the workstation, or server, with information necessary for operating, for example, with an asynchronous port and the software interface desired, and for providing the status display panels and service logs. To configure a server, a configuration file must be created. The configuration file defines parameters for the server, the adapter cards it contains, and the LAN and asynchronous connections to the server.

In the past, the configuration file had to be created by the user manually keying in the relevant data, i.e., various parameters for the server, the adapter cards it contains and the LAN and asynchronous connections to the server. Tables 1 and 2 illustrate sample configuration files which the user would have to create so that the program may be utilized.

TABLE 1

(Prior Art)

```
disp          type=status
              refresh_rate=30
              new_page=19-1bH
con           type=console
              keyboard=unlocked
connect       disp to con
★INCOMING
XTALKS7       type=NETBIOS        orientation=ORIGINATE
              protocol=ACSI       nametype=UNIQUE
MODEM7        type=RTICM          orientation=ANSWER
              adapter=0           port=7          mode=FIXED
              speed=1200          parity=ODD      data bits=7
connect       MODEM7 to TALKS7
   ★★★★★★★★★★★ Request Manager ★★★★★★★★★★★
REQM1         type-REQMGR
   service=Crosstalk service_netname=XTALK
```

TABLE 2

(Prior Art)

```
disp          type=status
              refresh_rate=30
              new_page=-19-1bH
con           type=console
              keyboard=unlocked
```

TABLE 2-continued (Prior Art)

```
connect       disp to con
★OUTGOING
XTALKS7       type=NETBIOS        orientation=ANSWER
              protocol=ACSI       nametype=UNIQUE
H1200         type=RTICM          orientation=ORIGINATE
              adapter=0           port=7          mode=FIXED
              asserted_leads=DSR
connect       XTALKS7 to H1200
   ★★★★★★★★★★★ Request Manager ★★★★★★★★★★★
REQM1         type=REQMGR
   pool=TOREMOTES       devices=H1200
   netname=MODEMS       nametype=UNIQUE
   target=XTALK         pool=TOREMOTES      phone=86659
   speed=1200           parity=ODD          data_bits=7
```

Obviously, the requirement that the user create such a configuration file resulted in data entry and keystroke error. Furthermore, the complexity of the data and connectivity options resulted in a requirement for extensive user knowledge of the underlying hardware operations and connectivity options. In addition, the user needed to be knowledgeable in the particular configuration language and syntax so that the configuration file could be created. A novice user is naturally quickly frustrated by such a process.

Other software programs having similar requirements utilize a menu-driven interface for obtaining all of the necessary parameters. The use of menus, however, can result in a time-consuming and, oftentimes, frustrating process.

SUMMARY OF THE INVENTION

It is therefore an object of the invention to provide an interface between a computer and a computer user which provides comprehensive information organized to support customer's tasks with minimal impact to the real-time processing.

It is a further object of the present invention to provide an interface with an uncluttered screen format having a graphical representation of the physical device that it represents.

It is a further object of the present invention to provide an interface for configuring a network of interconnect devices between LANs, between a LAN and a HOST, and for monitoring the network.

It is an additional object of the invention to provide a clear, concise and intuitive user interface which provides the novice user the support necessary to produce a configuration file for the program.

It is a further object of the present invention to provide a graphical interface for defining the hardware to be used, to define physical connections, and to provide an overview of existing connection possibilities based upon the connection options supported by the installed hardware.

It is still a further object of the present invention to provide a graphical interface having multiple views of data based upon the user's point of view.

It is another object of the present invention to provide a graphical user interface which discriminates physical and logical connection types.

It is a further object of the present invention to provide a graphical user interface which highlights the minimum set of essential parameters.

The present invention provides a display and control system which utilizes graphics for providing a clear, concise and intuitive interface between the user and a complex system. Icons are utilized for selectively representing components of the complex system, the components having a configurable relationship with one another. An example of such a component relationship is in a network where two components, in this case, network nodes, are linked so that they may communicate with one another. The display and control system of the present invention further utilizes a predefined array defining locations for the icons to be positioned.

In a first embodiment, the interface may be utilized in a network for assisting the user, normally a network manager, to initially configure the network and, second, for providing real-time monitoring of the network at the interconnect device, such as an LTLW. In particular, the network manager first configures the network by specifying which LANs are interconnected via the WAN (or WANs).

To maximize the efficiency of the LTLW presentation without impacting the performance of the frame-forwarding function, a grid of LTLWs is utilized. The grid contains forty-eight LTLWs concentric around a center viewbox. Both keyboard and mouse redundancy is provided for navigation and selection. Items that are selectable are given dimensional cues (via a shadowing effect). Known and unknown information is made unambiguous to the user by displaying a "?" for items which contain unknown information. Additionally, the grid is designed to allow the user to configure his or her network of LTLWs based on positional cues, simulating the layout of his or her network. Only relevant information is displayed to the user so that, while in configuration, both defined and undefined LTLWs are displayed, but while in monitor mode, only defined LTLWs are displayed.

In a second embodiment, the present invention is demonstrated by a display and control system which utilizes graphics for providing a clear, concise interface between the user and a workstation for configuring a file for use with an application software program in accordance with the hardware installed in the server workstation.

To specify the hardware to be used at the workstation, the user is provided with a list of possible hardware models to select from. Once a personal computer model has been selected, a visual image of the back of the personal computer is displayed. The graphical image of the back of the personal computer displays connection points in the same position, size, and visual image as found on the actual backplane of the box thereby making the user's task less difficult. Through the use of the graphical image, the user is able to select the appropriate hardware as installed in the server workstation, as well as the required connectivity options as required by the application software program.

Thus, the present invention provides a display and control system which presents the user with a clear, concise and intuitive interface which provides the user with necessary support to produce a minimum configuration as well as providing complete functional capability to establish and monitor a complex, optimized system. In addition, it provides a display and control system having a grid outlay which gives full visibility of a complex system and has little impact to the underlying frame-forwarding function of the workstation.

BRIEF DESCRIPTION OF THE DRAWINGS

The foregoing and other objects, advantages and aspects of the invention will be better understood from the following detailed description of the invention with reference to the drawing in which.

FTG. 5 is a pictorial representation of a display of a first screen of a second embodiment of the display and control system of the present invention.

Figure 6:
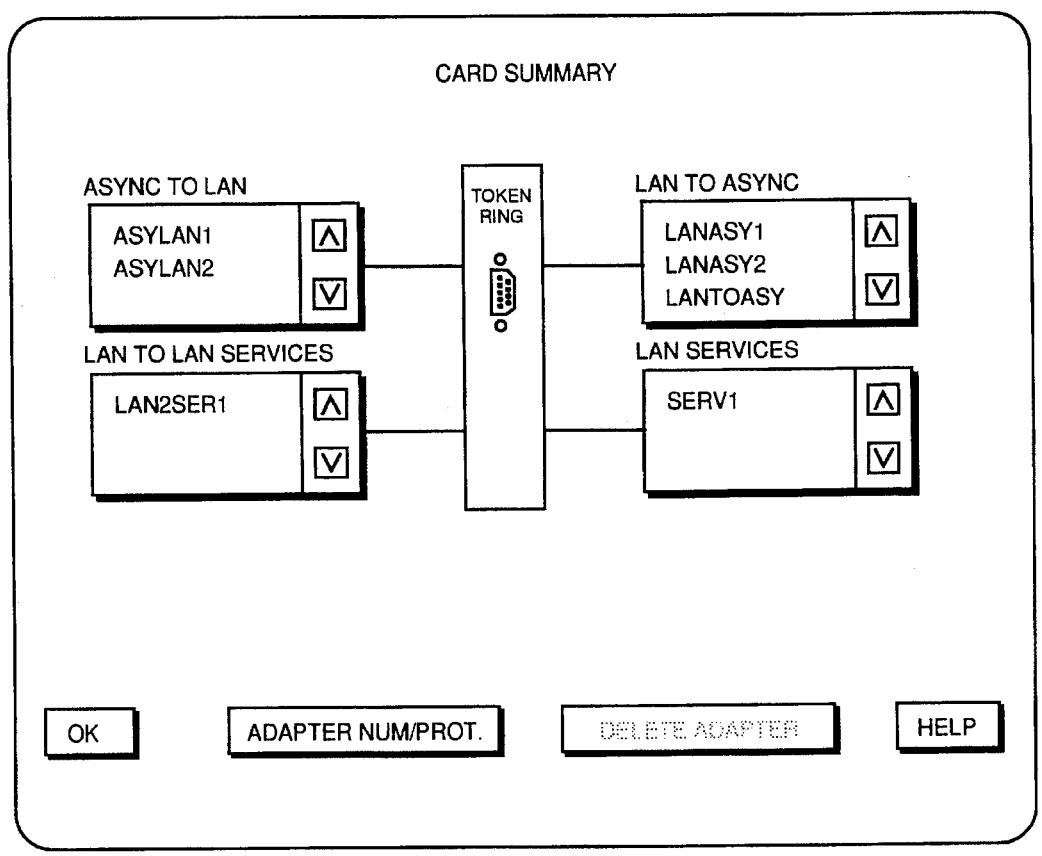

FIG. 6 is a pictorial representation of a display of a second screen of the second embodiment of the display and control system of the present invention.

Figure 7:
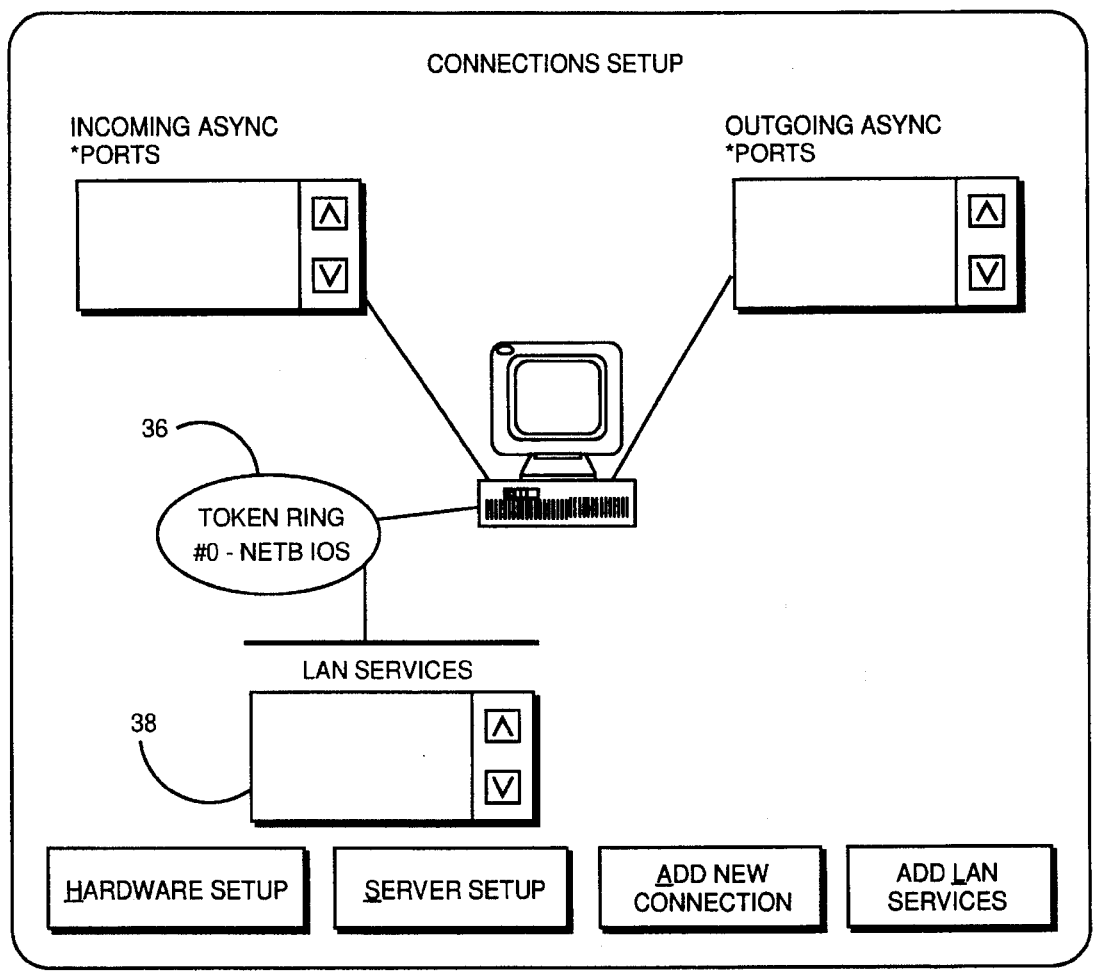

FIG. 7 is a pictorial representation of a display of a third screen of the second embodiment of the display and control system of the present invention.

Figure 5:
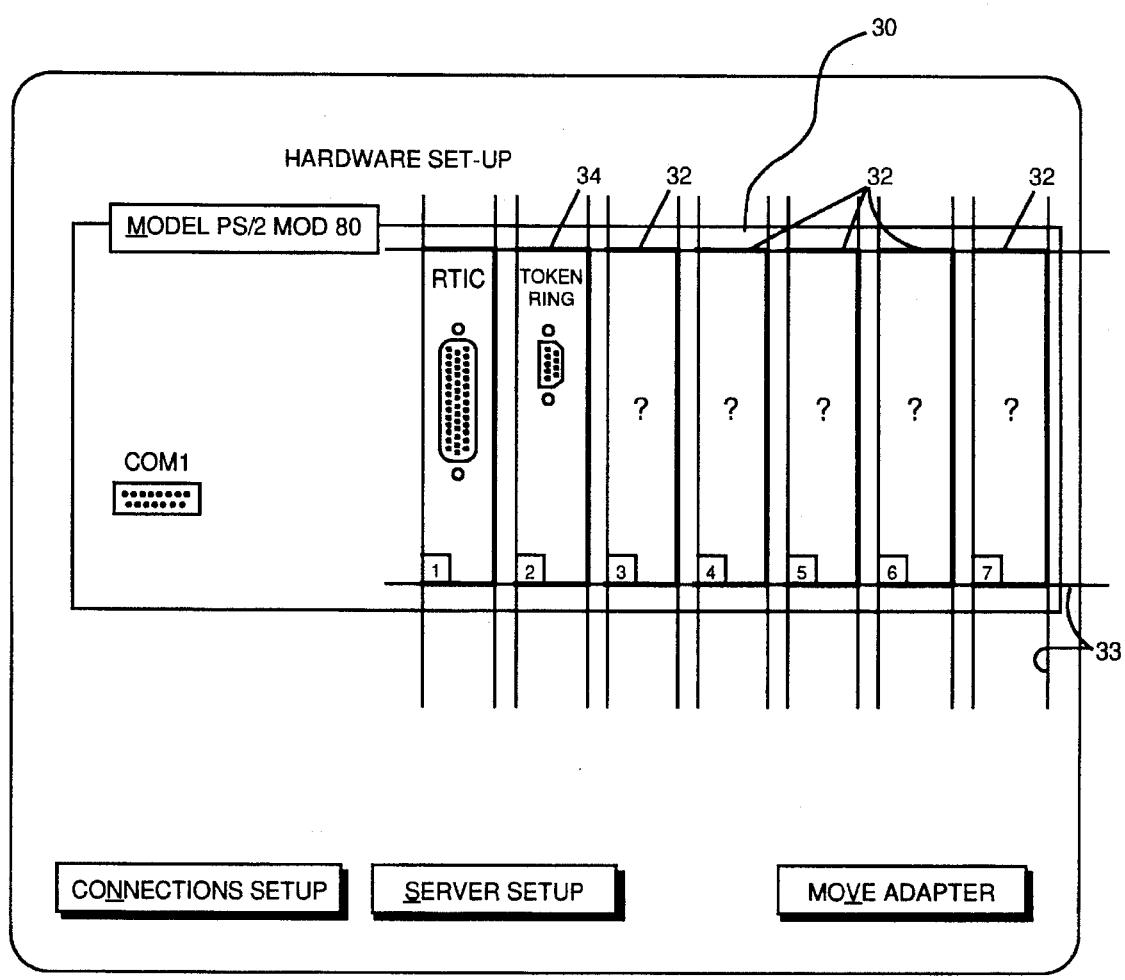

FIGS. 8A, 8B, 8C and 8D show a flow diagram of the operations performed with the displayed control system of the present invention as illustrated in FIGS. 5, 6 and 7.

FIGS. 9–16 illustrate the screen graphics of the second embodiment of the present invention as related to the flow diagram of FIGS. 8A–8D.

DESCRIPTION OF THE PREFERRED EMBODIMENTS

Figure 1:
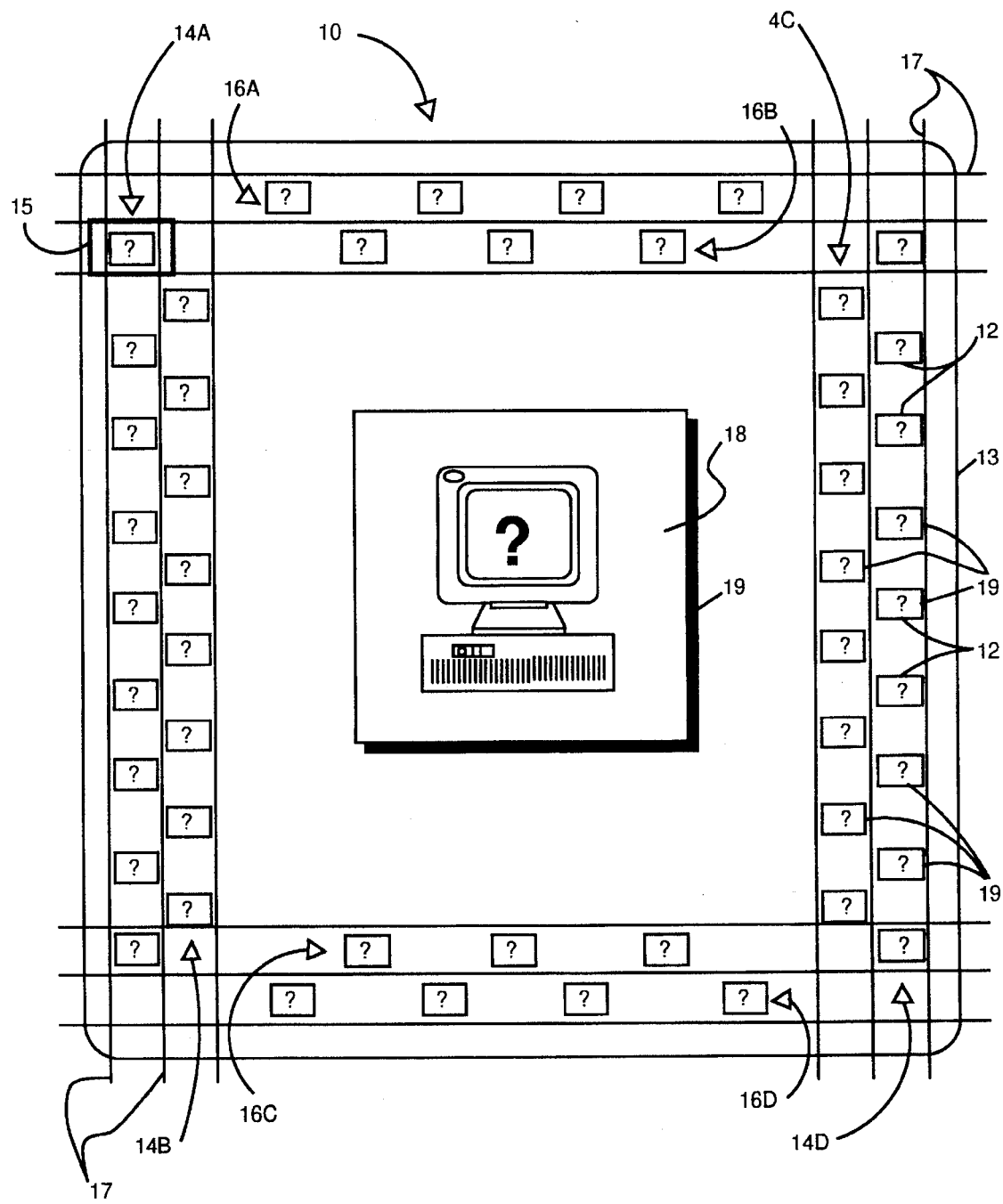
FIG. 1 is a pictorial representation of a display of a first embodiment illustrating the display and control system of the present invention in the "configure" mode.

Referring now to FIG. 1, therein is illustrated a first embodiment of the display portion 10 of the display and control system of the present invention. The display portion 10 comprises a screen 13 having a plurality of boxes 12 concentric around the perimeter of the screen. The boxes represent components in a complex system. The number of boxes utilized, in the present case, forty-eight (48), is dependent upon the characteristics of the system being monitored and configured.

The display utilizes a predefined grid 17, or array, for positioning the boxes around the perimeter of the computer screen. It should be noted that grid 17 is shown in the figure to illustrate the array structure but, in the actual implementation of the system, the grid is not visible to the user. Each box is "assigned" a predetermined location within the array and cannot be moved from that predefined location. As can be seen in FIG. 1, the present display array comprises four vertical columns 14A, 14B, 14C and 14D and four horizontal rows 16A, 16B, 16C and 16D. Although the array utilized by the display may be configured in any manner desired, in the present array, column 14A has nine boxes; column 14B has eight boxes; column 14C has eight boxes; and column 14D has nine boxes. In addition, rows 16A and 16D each comprise five boxes while rows 16B and 16C each have three boxes. A cursor 15 may be maneuvered by the user via a mouse or the user's keyboard for selecting an appropriate box in the array.

In the center of the display is a center viewbox 18. The center viewbox 18 is presented as a graphical image of an IBM Personal System/2 (PS/2) Personal Computer. Personal System/2 and PS/2 are registered trademarks of IBM Corporation. The viewbox acts as a mechanism to allow the user to access relevant details associated with any given box. In the present application, the boxes represent local area network (LAN) to LAN wide area network (WAN) program servers (LTLWs) such as personal computers running such programs. It should be noted, however, that the present invention may be utilized by other application programs and should not be so limited.

As shown in FIG. 1, boxes 12 are laid out in a grid 17, or an array, each box having a predefined location in the array 17. Although each box 12 is selectable and may be configured in a variety of ways, the boxes must remain positioned in the associated predefined location in the array 17.

To maximize the efficiency of the LTLW presentation without impacting the performance of the frame-forwarding function of the server, a grid of boxes, or LTLWs, is utilized as discussed above. Both keyboard and mouse redundancy is provided for navigation and selection. Items that are selectable are given dimensional queues (via a shadowing effect). As can be seen in FIG. 1, each of the boxes 12 and the center viewbox 18 has a "shadow" 19 cast on its right and bottom sides as if a light were shining from the upper left corner of the display.

Known and unknown information is made unambiguous to the user by displaying a "?" for items which contain unknown information. This feature can also be seen in FIG. 1 as each box 12 and the center viewbox 18 has a "?" located in its center. Additionally, the grid is designed to allow the user to configure his or her network of LTLWs based on positional queues, simulating the layout of his or her network. Only relevant information is displayed to the user so that, while in configuration mode, both defined and undefined LTLWs are displayed, but while in monitor mode, only defined LTLWs are displayed. FIG. 1 illustrates the system in the configure mode while FIG. 2 illustrates the system in the monitor mode.

As shown in FIG. 1, the configuration program initially places a "?" in the center viewbox 18 to indicate that there is no LTLW selected for configuring. As the user selects an LTLW (FIG. 2), the center viewbox 18 displays the relevant information related to the particular LTLW selected, in the present case, naming and link information with respect to the remaining LTLWs displayed. Less frequently used information is accessible either by clicking on the center viewbox 18 or by selecting a push button on the main screen. The monitor program uses the center viewbox 18 to display information from the perspective of the LTLW resident on the computer.

Figure 2:
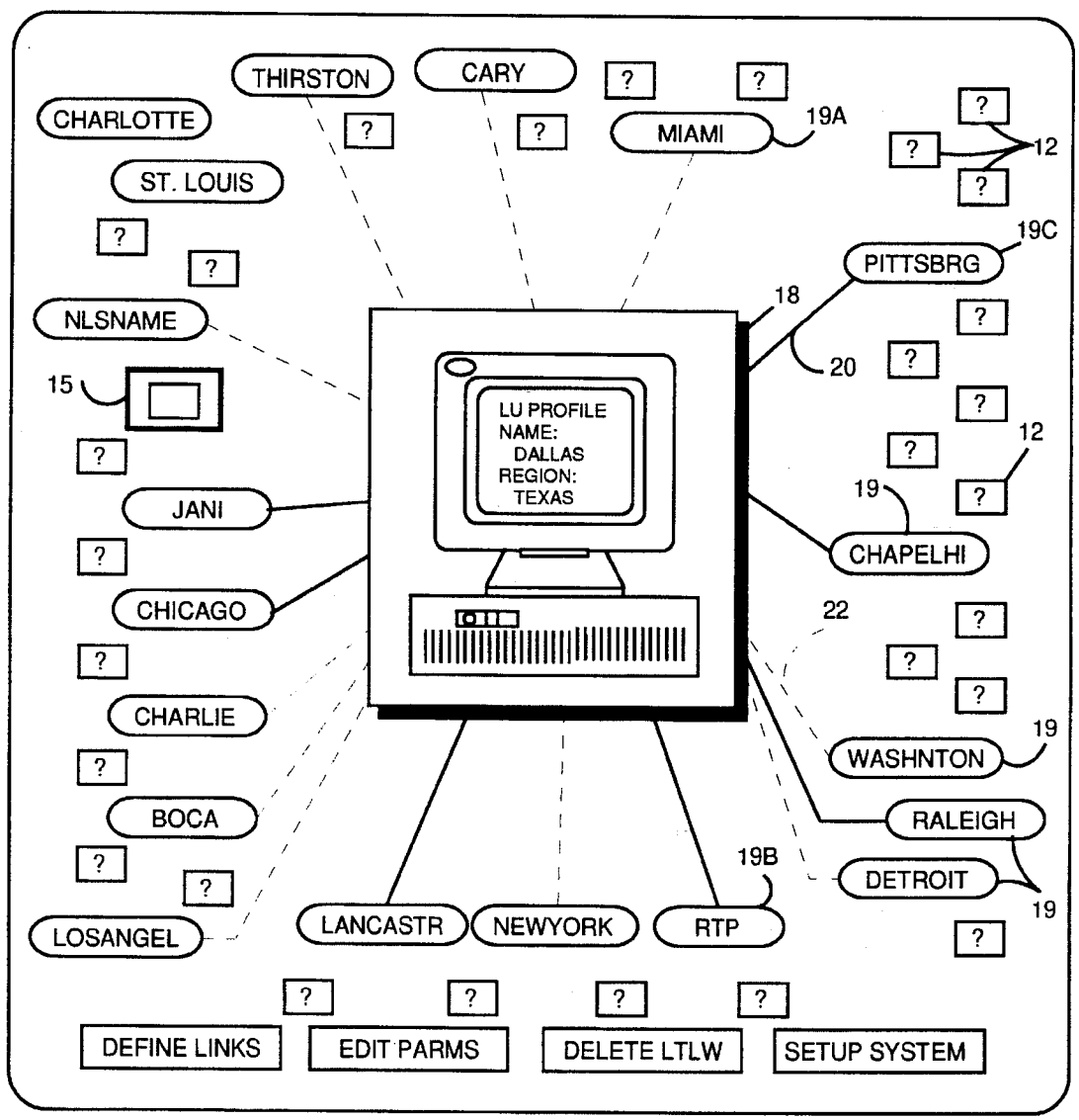
FIG. 2 is a pictorial representation of a display of the first embodiment illustrating the display and control system of the present invention in the "monitor" mode.

As can be seen in FIG. 2, by displaying the network from the center viewbox 18 perspective, the user can readily identify naming information and configuration of links. The links between the selected LTLW ("DALLAS") and the remaining LTLWs are clearly displayed with solid lines 20 or dashed lines 22. In this manner, configuration details for the entire network can be displayed, with a minimal amount of human effort or CPU resources, by repetitively selecting LTLWs. (The selectable LTLWs for monitoring purposes are those which have already been configured, i.e., those which are oval-shaped having a name in the center thereof in contrast to the boxes having a "?" in the center thereof.)

Further, as can be seen in FIG. 2, after a box 12 is selected and configured (during the "configure" mode shown in FIG. 1), it is replaced by an oval-shaped icon 19. Each oval-shaped icon 19 has, in its center, its profile name, i.e., "PITTSBRG", "MIAMI", etc.

Unique to this interface is the ability of the user to select a LTLW from the grid, and see its associated links 20 and 22. These links will differ depending upon the configuration of the specific LTLW selected. This solves the problem of representing the complexities associated with the vast network of communication links. With minimal keystrokes, the user can get a "snapshot" of the communication links of every LTLW in his network. In the present case, an automatic link is represented by a solid line 20 while a manual link is represented by a dashed line 22.

To differentiate between two possible types of links, the interface displays the link type as a solid line 20 or a dashed line 22. Current link configurations are displayed as lines between the center viewbox 18 and the partner LTLWs are on the grid. Links may have three possible configurations (which are displayed when the link type is reviewed or edited in either configuration or monitor mode): 1) no link exists—no line (no communication activity); 2) manual link—dashed line (starting of the link communication between two LTLWs must be done by user intervention); and 3) autolink—solid line (link is automatically initiated when the LTLW begins its frame forwarding process).

Real-time information displaying the state of the link being monitored is conveyed to the user by displaying varying line lengths. This can be seen in FIG. 3. Current activity level of the link is represented as a line from a partner LTLW to the center viewbox 18 LTLW. The activity level of the link may be in one of the following states:

1) inactive—no line (no communication activity);

2) starting—a half-line (link communication is initializing);

3) active—a full line (link communication is able to send/receive frames); and 4) stopping—a half-line (link is being deactivated and network resources released).

Figure 3:
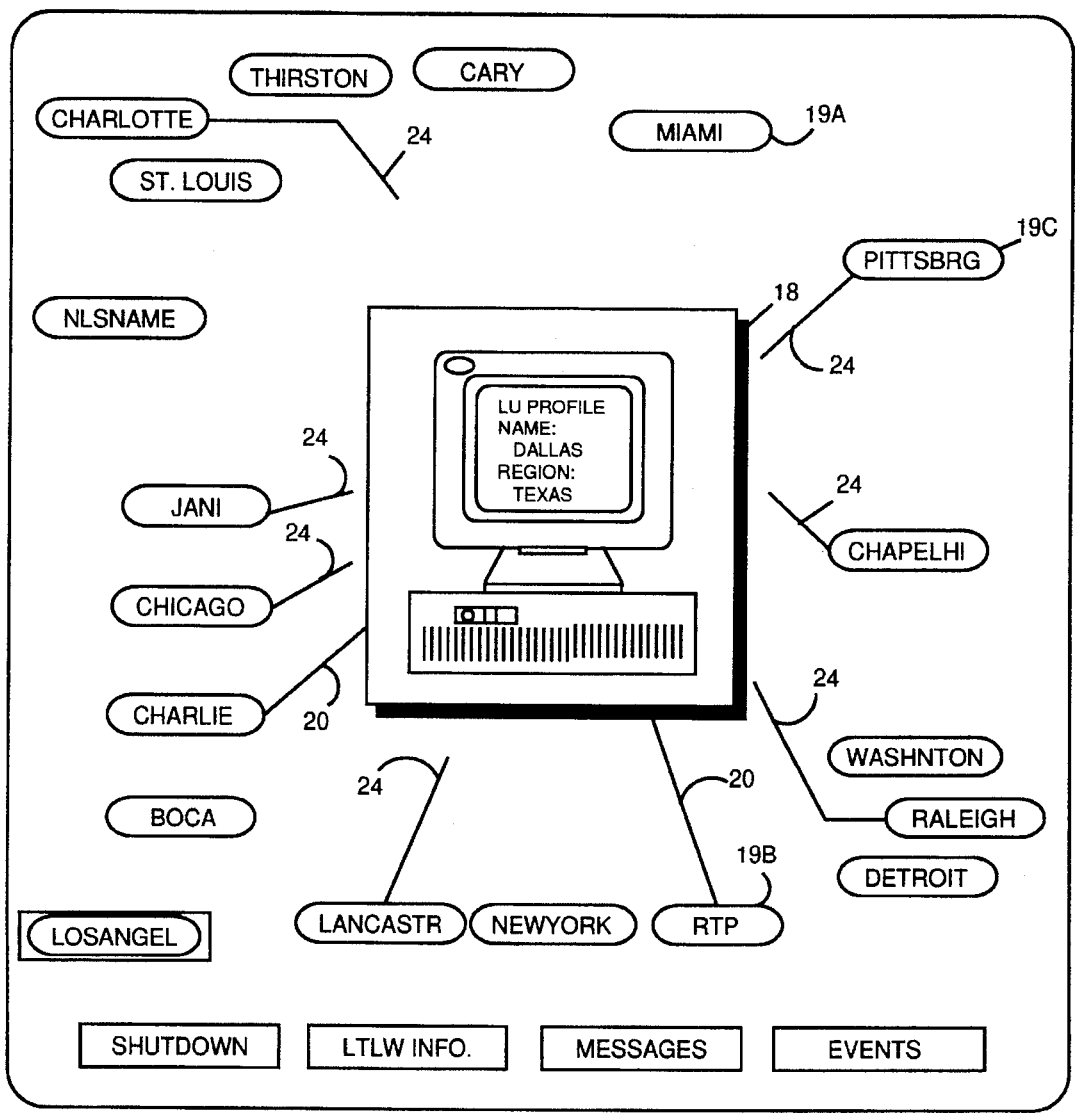
FIG. 3 is a pictorial representation of a display of the first embodiment illustrating the real-time monitoring of the display and control system of the present invention.

Each of the above-referenced states is illustrated in FIG. 3. For instance, the inactive state is illustrated by the non-existence of a line between LTLW 19A ("MIAMI") and center viewbox 18 ("DALLAS"). The active state is illustrated by the solid line between, for example, LTLW 19B ("RTP") and center viewbox 18 ("DALLAS"). The starting and stopping states are illustrated by a half-line 24 extending from a particular LTLW (e.g., LTLW 19C ("PITTSBRG")) towards the center viewbox 18 ("DALLAS"). The starting and stopping states are distinguished in that a solid line 20 "shrinks" back to a half-line 24 and finally to a non-existent line to indicate that the connection is stopping. To indicate that a connection is starting, a half-line 24 appears where no line existed previously and subsequently extends completely towards the center viewbox 18 ("DALLAS") when the connection is active.

The advantage of this presentation is that it allows the user to immediately access the activity level of the links between the local LTLW and the LTLW partners. Additionally, lines are color-coded to provide more information about the condition of the links (i.e., approaching critical resource limits, detecting communications failures and retrying link initialization). While other networking applications use this color-coding scheme (or similar ones) to represent error conditions, this approach uses line length in addition to color to couple activity level with link conditions for a more complete representation of the link state. The use of varying line lengths is a natural representation for link connectivity. The appeal of this design is that it matches the conceptual idea that users have about connectivity between nodes and the network and represents it pictorially.

Rather than using color codes that may confuse the meaning of the link type with the link state, the LTLW uses different textural information. Although textural information has been used to represent line speeds in other networking applications, no other applications use it to represent link type. This representation allows the user to tell, at a glance, whether any action is required of him or her (such as with a manual link) or not (such as in an automatic link).

Figure 4A:
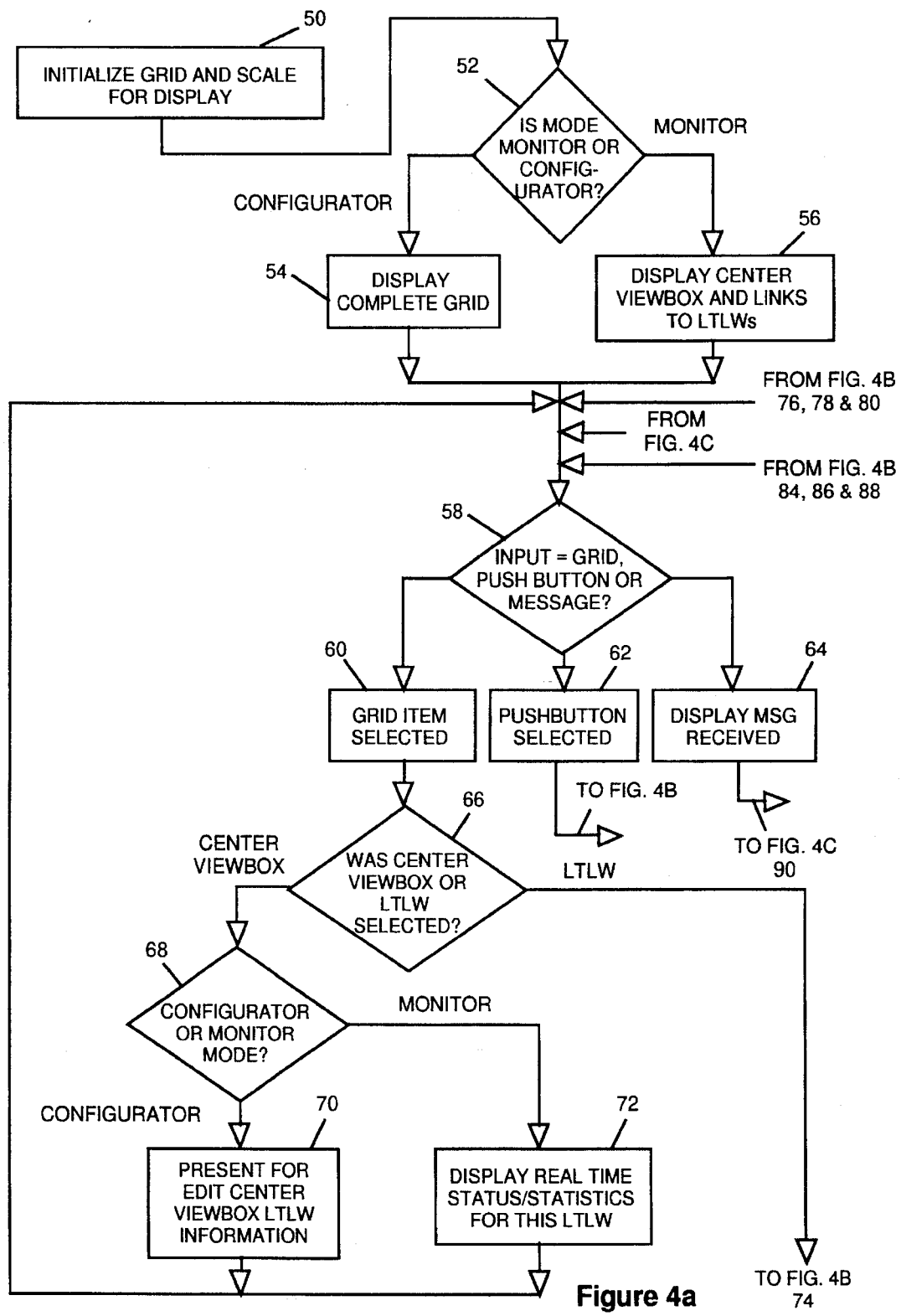
FIG. 4A, 4B and 4C show a flow diagram of the operations performed with the display and control system of the present invention as illustrated in FIG. 1, FIG. 2, and FIG. 3.
Figure 4B:
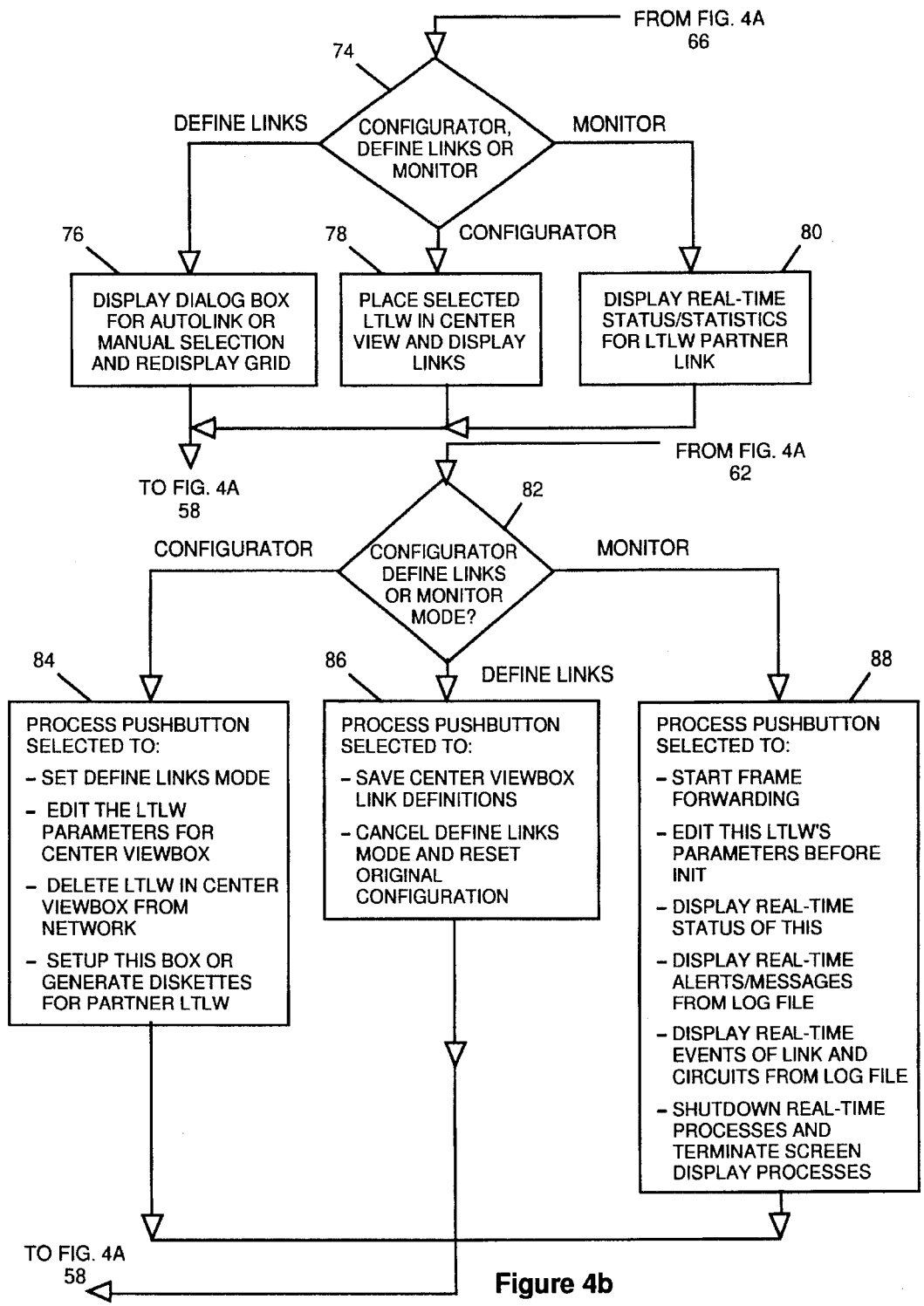
Figure 4C:
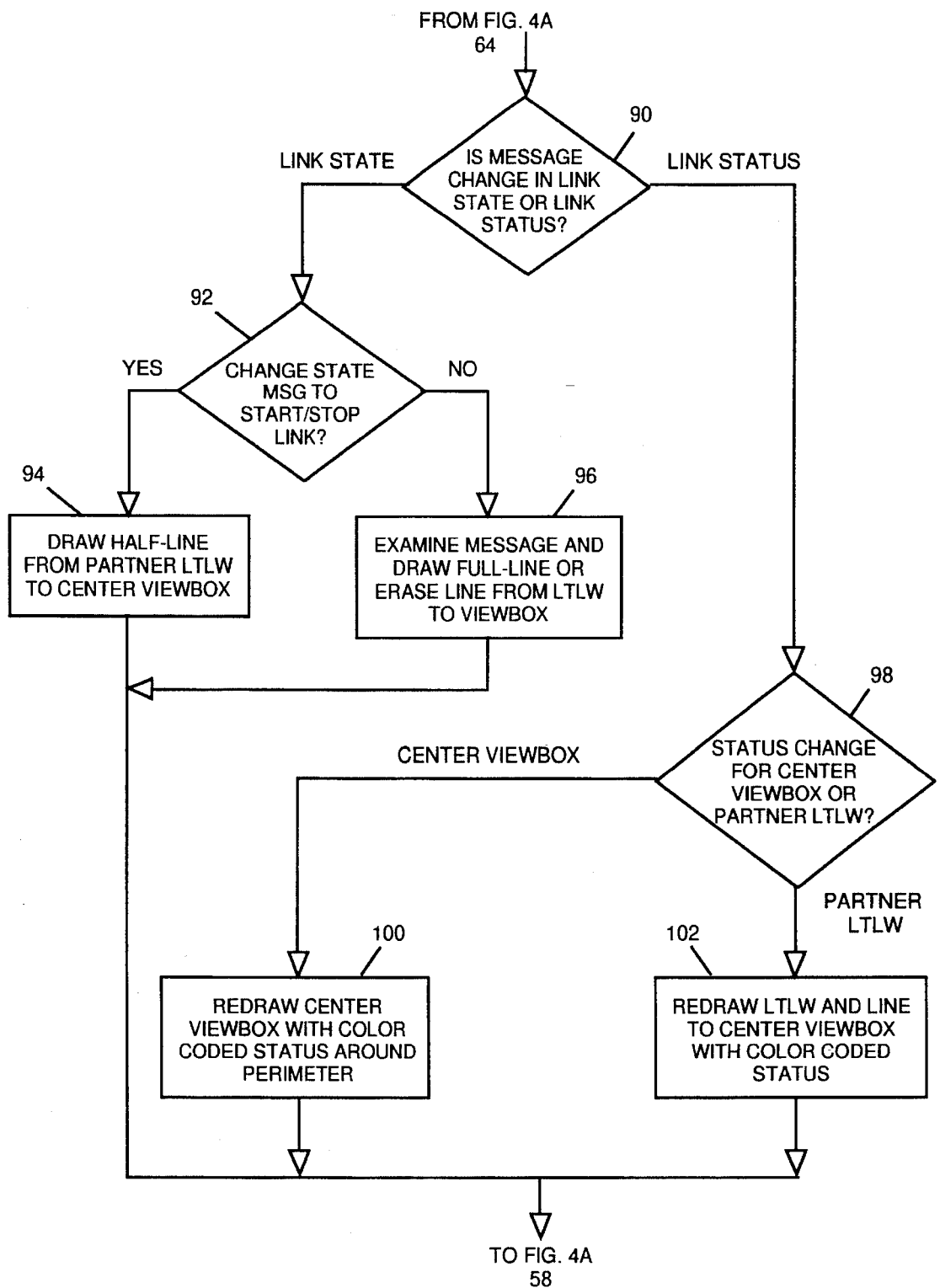

Refer next to FIG. 4 wherein there is illustrated in greater detail the operations performed in assembling the screens of the display and control system of FIG. 1, FIG. 2 and FIG. 3. First, as indicated by block 50, the screen as shown in FIG. 1 is initialized as if there is no present configurations set up. Next, as indicated by block 52, the system determines whether it is running in "monitor" or "configurator" mode. If it is determined to be in "configurator" mode as indicated by block 54, the complete grid, including boxes 12 and defined LTLWs 19 are displayed on the screen as shown in FIG. 2. If the "monitor" mode is to be used as indicated by block 56, the center viewbox 18 and links 20, 22 to associated LTLWs 19 are displayed as shown in FIG. 3.

As indicated by block 58, the system waits for inputs by the user and the frame forwarding process. The user may input to the system via a mouse or a keyboard pushbutton. The frame forwarding process sends status messages to the interface to update the status of links and the center viewbox. When the user uses the mouse or keyboard to select an item on the grid (i.e., center viewbox, LTLW partner), the interface proceeds to display information about the item selected, as indicated in block 60. If the user selects a pushbutton on the display, a function is invoked to process the particular function selected, as indicated in block 62. Ira status message from the frame forwarding process is received, block 64 indicates a function is invoked to update the display with the current status as defined in the message. Upon completion of these functions to process inputs, the system returns to block 58 to wait for more inputs from the user or frame forwarding process.

As indicated by block 66, it is determined whether the center viewbox or an LTLW was selected by the user. If the center viewbox is selected, it is determined if the system is being utilized in the "monitor" or the "configurator" mode as shown by block 68. If the system is being utilized in the "configurator" mode, the center viewbox LTLW information is presented to the user for editing as illustrated by block 70. As shown by block 72, if the system is being utilized in the "monitor" mode, the real-time status/statistics of the center viewbox LTLW is display on the screen to the user.

As indicated by block 74, if an LTLW is selected by the user, it is determined whether the system is in "configurator", "monitor" or "define links" mode. When in "define links" mode, links are to be defined for a LTLW, as shown by block 76. The user may select either autolink (as indicated by a solid line on the screen) or manual link (as indicated by a dashed line on the screen). The grid is then redisplayed on the screen. If the system is in "configurator" mode, as indicated by block 78, the selected LTLW is placed in the center viewbox and its associated links are displayed. If the system is in "monitor" mode, its real-time status/ statistics relating to the partner LTLW links are displayed as indicated by block 80.

When a pushbutton has been selected, as indicated by block 82, it is determined what mode the system is currently in to determine which pushbutton functions to perform. When in the configuration mode, as shown by block 84, it is determined whether the pushbutton selected is defined to: (1) set define links mode; (2) edit the LTLW parameters for center viewbox; (3) delete LTLW in center viewbox from network; or (4) setup this box or generate diskettes for partner LTLW. As shown in block 86, when in define links mode, it is determined whether the pushbutton is selected to: (1) save the center viewbox link definitions; or (2) cancel define links mode and reset original configuration. When in monitor mode, as indicated by block 88, it is determined whether the pushbutton is defined to: (1) start the frame forwarding process; (2) edit this LTLW's parameters before initialization; (3) display real-time status of this LTLW; (4) display real-time alerts/messages from Log File; (5) display real-time events of links and circuits from Log File; or (6) shutdown real-time processes and terminate screen display process.

As indicated by block 90, it is determined whether the message indicates to display a change in the link state or in the link status. As indicated by block 92, a determination is made whether a link is starting or stopping. If the link is starting or stopping, as indicated by block 94, a half-line is drawn on the screen from partner LTLW toward the center viewbox. If not, as shown by block 96, the message is examined and a full-line is drawn or line is erased from the selected LTLW to the center viewbox. If the status has changed, it is determined whether the status of the center viewbox or a LTLW partner link has changed. This is shown by block 98. If the status of the center viewbox has changed, as indicated by block 100, the center viewbox is redrawn with a color-coded indicator around its perimeter. If the status of a LTLW partner has changed, as indicated by block 102, the LTLW partner and the line from it is redrawn with a color-coded indicator.

Thus, the LTLW employs several unique features in presenting and defining a network to the user. It uses a grid outlay that gives full visibility of large network of LTLWs and has little impact to the underlying frame forwarding function. Easy navigation and immediate access to pertinent information is provided. The center viewbox 18 presents a graphical image representative of the LTLW and draws a perspective of the network for each LTLW. Real-time status is displayed using color, movement and textural information. Links grow to half-lines indicating a connection is starting. Full lines give status indication that links are active and may have critical conditions that need attention. Links shrink back to half-lines to indicate the connection is stopping. The LTLW interface is unique in appearance and in structure to reflect real-time processing of resources and communication statuses. The design was made to satisfy easy, concise information presentation without impacting real-time functions.

In a second embodiment, the present invention is demonstrated by a display and control system which utilizes graphics for providing a clear, concise user interface for configuring an application software program in accordance with the hardware installed in the server workstation.

To specify the hardware to be used at the workstation, the user is provided with a list of possible hardware models to select from. Once a personal computer platform has been selected, a visual image of the back of the personal computer is displayed. The graphical image of the back of the personal computer displays connection points in the same position, scale, and visual image as found on the actual backplane of the box, thereby making the user's task less difficult. Through the use of the graphical image, the user is able to select the appropriate hardware as installed in the server workstation, as well as the required connectivity options as required by the application software program.

In order to illustrate the second embodiment, a dedicated server workstation for configuring IBM's Local Area Network Asynchronous Connection Server Version 2.0 (LANACS 2.0) is discussed. Again, it should be noted that the invention should not be so limited. LANACS 2.0 is utilized by the workstation to establish connections between individual LAN workstations and other hosts or workstations.

In order to utilize the LANACS software, the user must specify the hardware to be used at the server workstation. For example, if PC Network or Token-Ring support is desired, PC Network or Token-Ring adapters are required to be installed in the server workstation. Once the adapters are installed in the workstation, the workstation must be "told" which adapters are installed and where they are installed, i.e., which slot in the workstation's backplane the adapters are installed.

To specify the hardware to be used at the workstation, the user is provided with a list of possible hardware platforms to select from. As can be seen in FIG. 5, once a personal computer model has been selected (in this case a PS/2 Model 80), a visual image of the back of the personal computer 30 is displayed. The graphical image of the back of the computer 30 illustrates to the user slots 32 in the computer backplane in which interface cards are inserted. Using the PS/2 Model 80 as an example, seven slots are available for expansion and two slots (1 and 2) are utilized.

Similar to the first embodiment, the second embodiment of the display and control system utilizes a grid 33 defining a plurality of locations on the screen. Although the interface cards which are positioned within the slots 32 are selectable and may be configured in a variety of ways, the slots 32 must remain positioned in the associated predefined location in the grid 33.

The hardware view of the personal computer and its associated slots immediately demonstrates to the user the maximum number of interface cards possible, the number currently configured, as well as the installed card types. The picture uses an outline of the back of the box to provide context. The graphical image of the back of the personal computer displays connection points in the same position, size, and visual image as found on the actual backplane of the box thereby making the user's task less difficult.

The user selects one of the empty slots (indicated by a question mark), and receives a list of possible cards to select from. Once a card type is chosen, its image appears in the slot. The user repeats this card selection/slot selection until the image created on the screen matches the physical computer configuration. This position and scale conformance makes the user's task one of visually verifying the image on the screen with the hardware sitting on his or her desk.

Once the hardware has been defined, the user is provided with an overview of existing connection possibilities based on the connection options supported by the installed hardware. This is shown in FIG. 7. Initially, no connection possibilities are displayed. The user selects "Add New Connection" to begin specifying connections. A list of logical connection options, based upon the hardware installed, is presented.

Once a connection is selected, all the associated parameters and/or pictographic connection data is displayed for user review/modification. This is shown in FIG. 7. Users repeat this until all connectivity is defined. As each new connectivity option is defined, the connectivity summary screen is updated.

The underlying structure of the software is a complex multi-parameter data set. This underlying complexity does not support the user's task or the user's view of the system.

The user sees his task as involving two components: 1) defining the hardware present; and 2) defining the associated connections.

In order to present this complex data in an intuitive way to the user, thus matching the user perspective, multiple redundant views of the same data are provided. The user can look at the LANACS configuration from three different views: (1) the hardware view (FIG. 5); (2) the card view (FIG. 6); and (3) the connection view (FIG. 7). Much of the same information is presented in a different context in each view. When the user is defining the hardware in the box, only valid card options are presented. When the user is defining connections, the image contains color-coded lines and nodes and only valid connection options are allowed. When looking at the connection summary, the image is a pictograph of the network and its primary connection types are displayed. For example, the token ring is illustrated differently in each of the three views. In the hardware view (FIG. 5), the token ring is illustrated as a connector on a card 34 installed in the back of the box 30. In the connection view (FIG. 7), token ring is illustrated as an oval 36 with the associated LAN number and protocols supported as well as the defined connection destination 38 attached. Finally, in the card view (FIG. 6), token ring is illustrated as a connector on the card with the individual connection names grouped under one of the four connection types.

Each view is useful in different situations. If the user wants to know all of the connection types and names on the token ring card or change the protocol supported on the token ring card, the card view (FIG. 6) can be used. If the user wants to add another adapter, the hardware view is used (FIG. 5). If the user wants to see all of the destinations that can be accessed on the token ring, the connection view (FIG. 7) is used.

Using this approach, where parameters are selected from the data set and reformatted to match the user's current orientation, the learnability of the task is dramatically facilitated. In addition, the potential for making errors compared to straight parametric data set access, is reduced.

To establish any connection, physical links and software controlled or logical links must be defined. Since characteristics and associated parameters are unique to link type, it is imperative that the user has a clear and immediate understanding of link type. In order to provide this clear discrimination cue, link type is color-coded throughout the interface. The color code of the physical link was selected as black to match the nominal color found in the user's physical reality (i.e., a black cable). The color code of the logical link was selected as blue to avoid any conflict with the color coding used for alerting in other applications, i.e., where red usually signifies an error condition, etc.

In order to assist the less-experienced user while not restricting experienced users from the richness of options, it was decided to control the user's focus whenever parameters were displayed, rather than hide parameters from skilled users, thus requiring them to access additional information. In this application, the highlighting effect is achieved by drawing a yellow halo around all entries or selection fields that cannot be defaulted, requiring user input to produce a usable configuration. The yellow halo is present only until a valid selection or entry is made. The result is novice users merely have to proceed through the interface watching for yellow halos and ignoring all other parameters displayed, while the skilled user is provided immediate access to all other parameters, plus the additional identification of required fields.

Figure 8A:
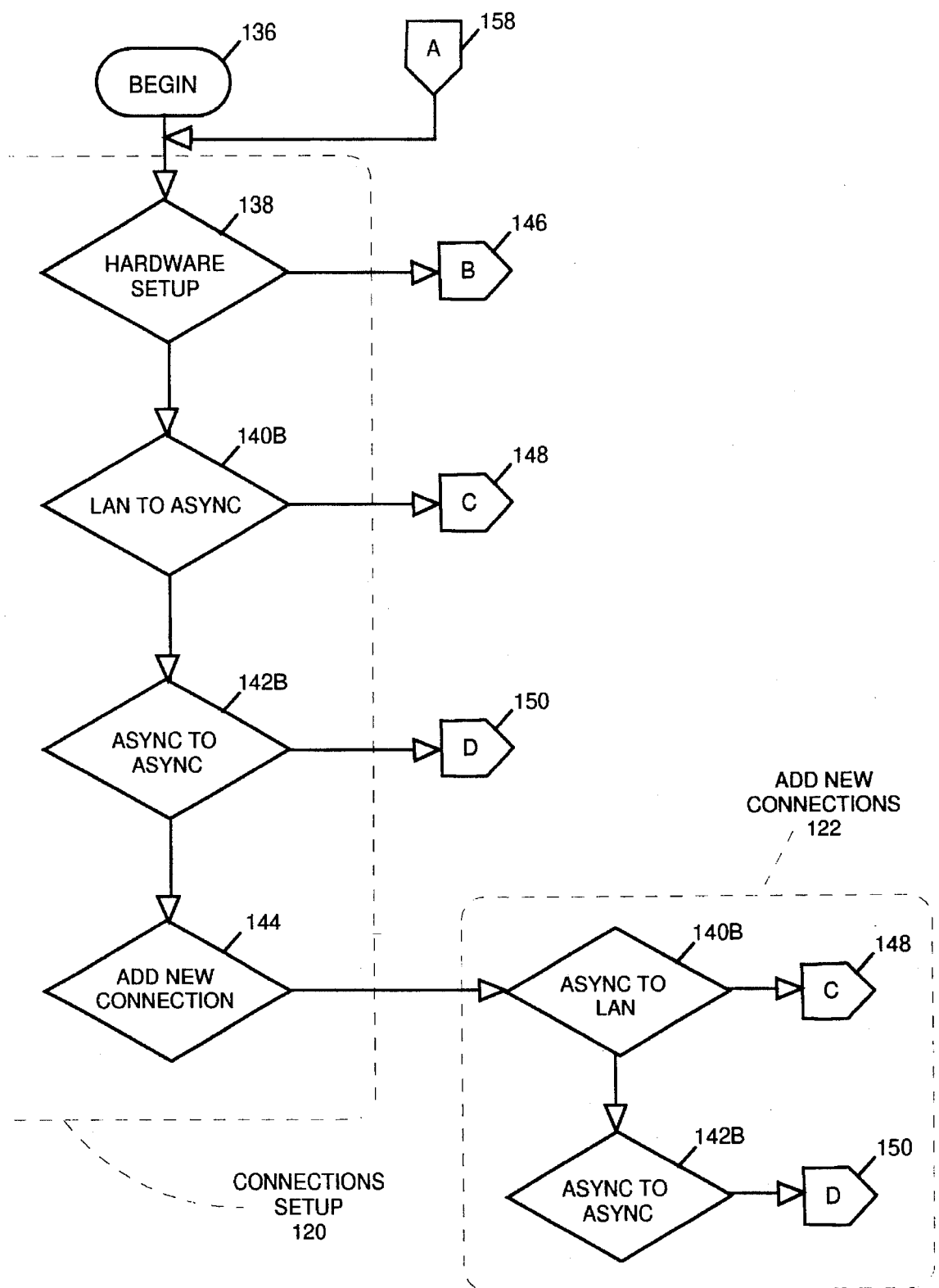
Figure 8B:
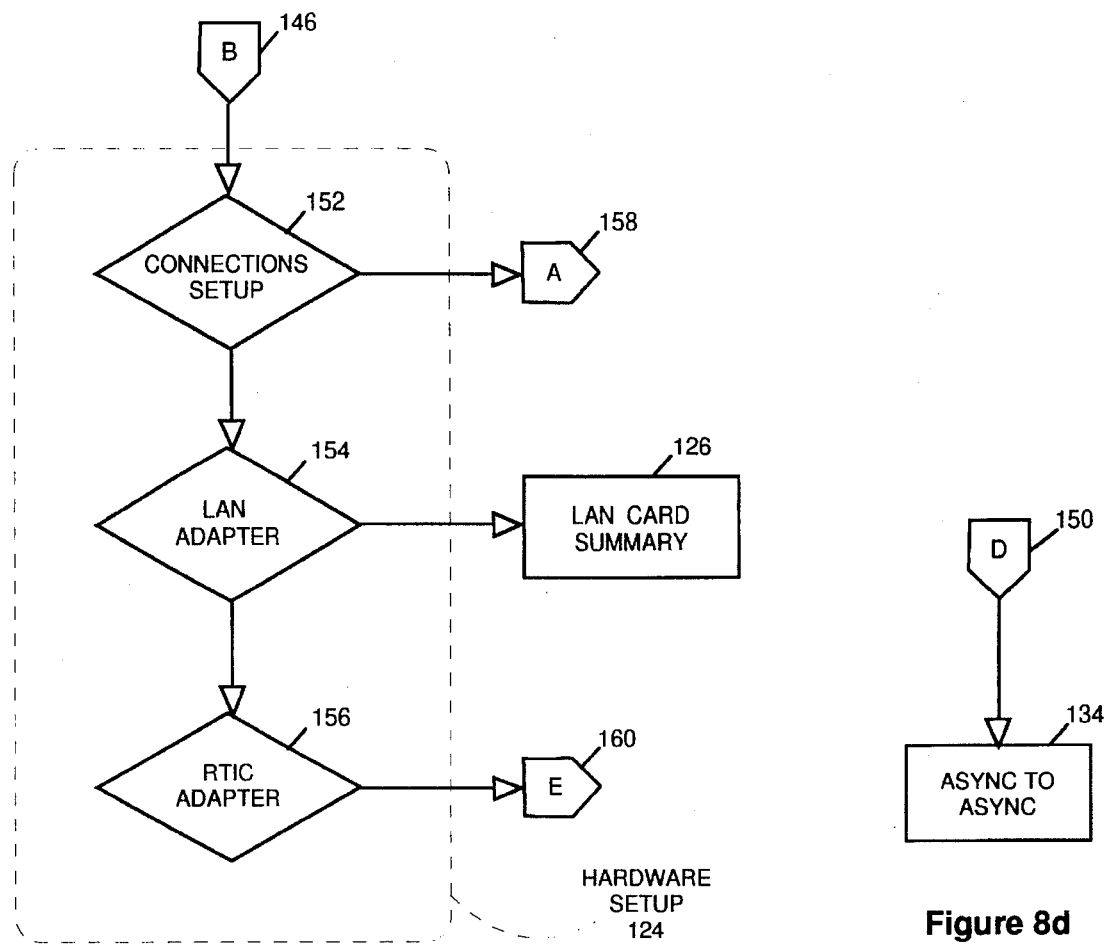
Figure 8C:
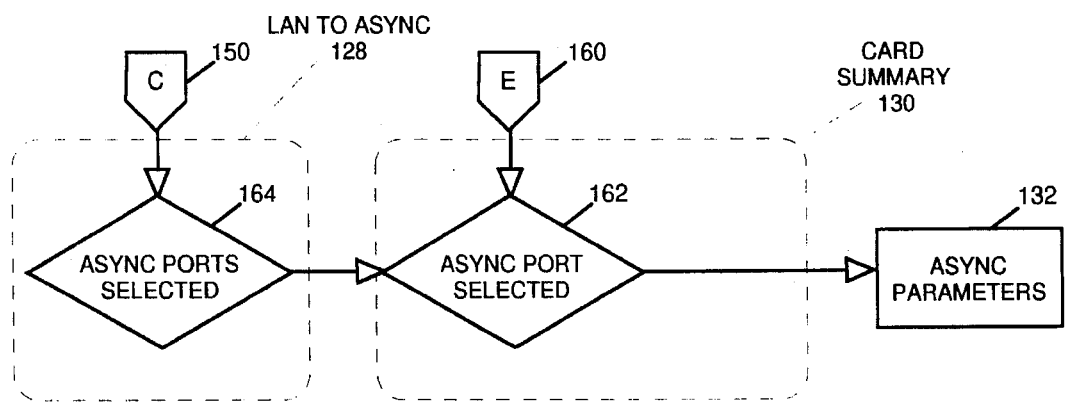
Figure 9:
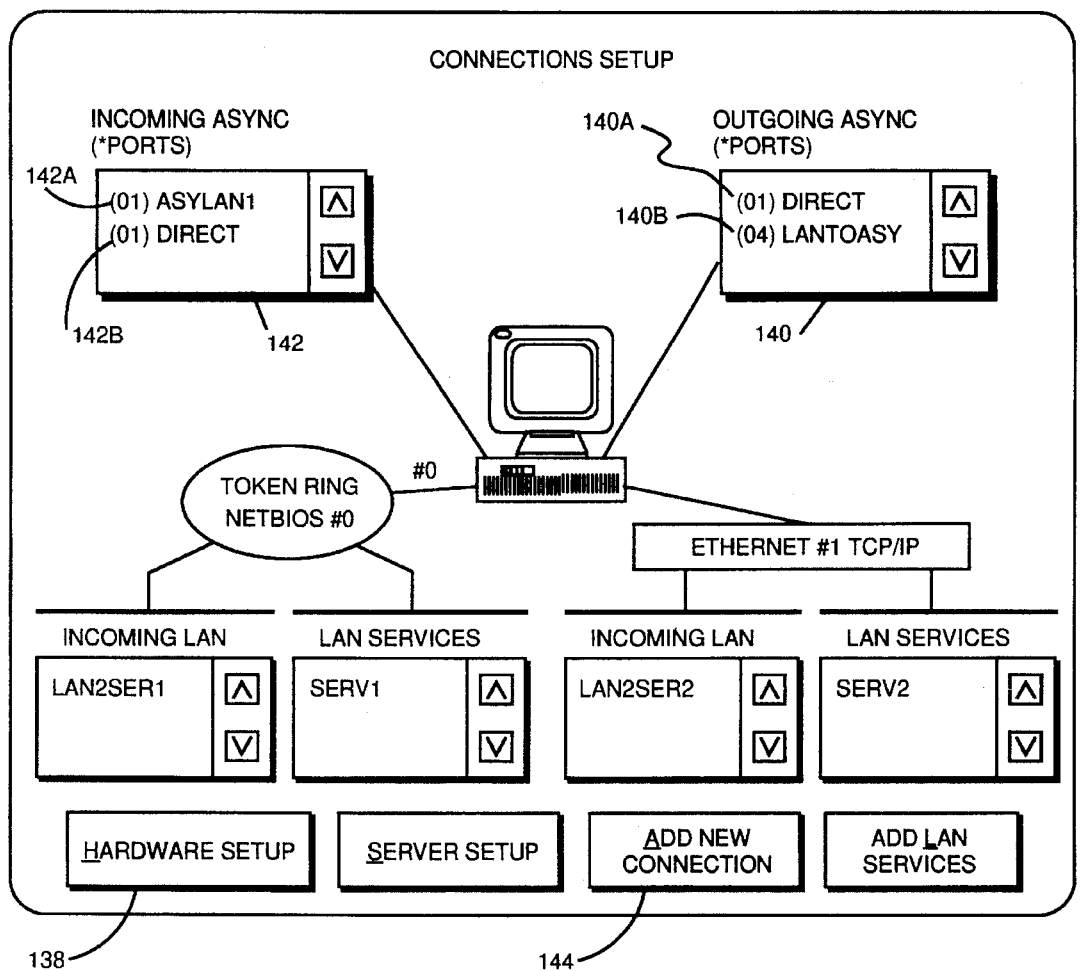
Figure 10:
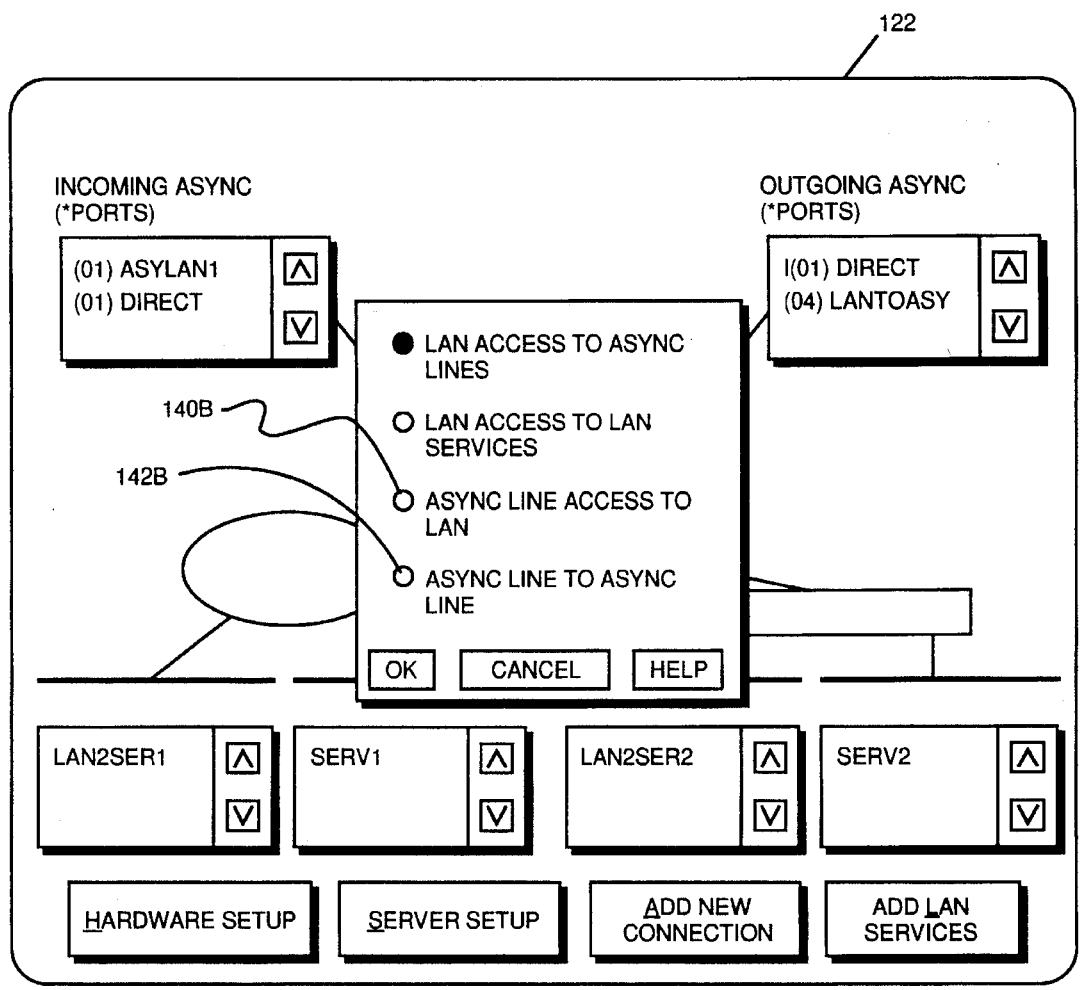
Figure 11:
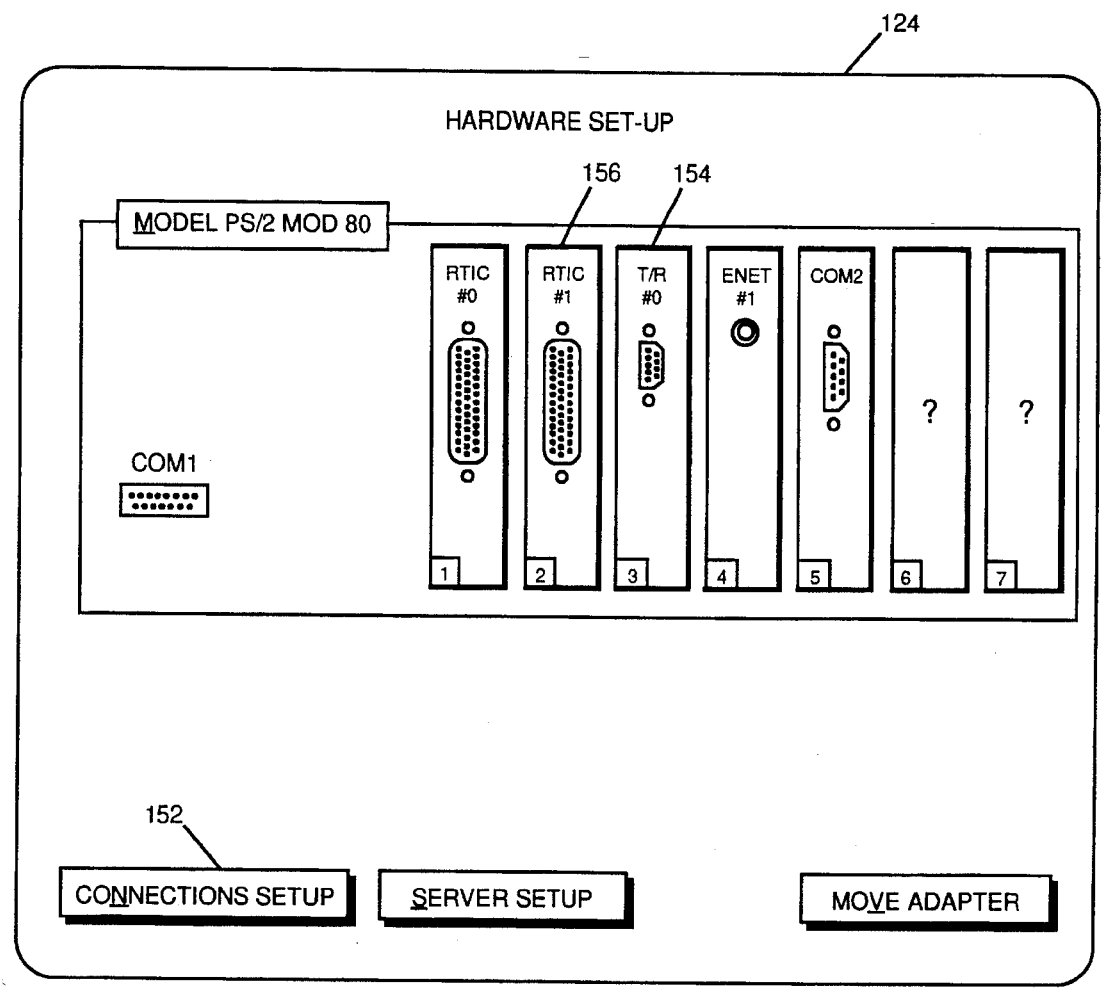
Figure 12:
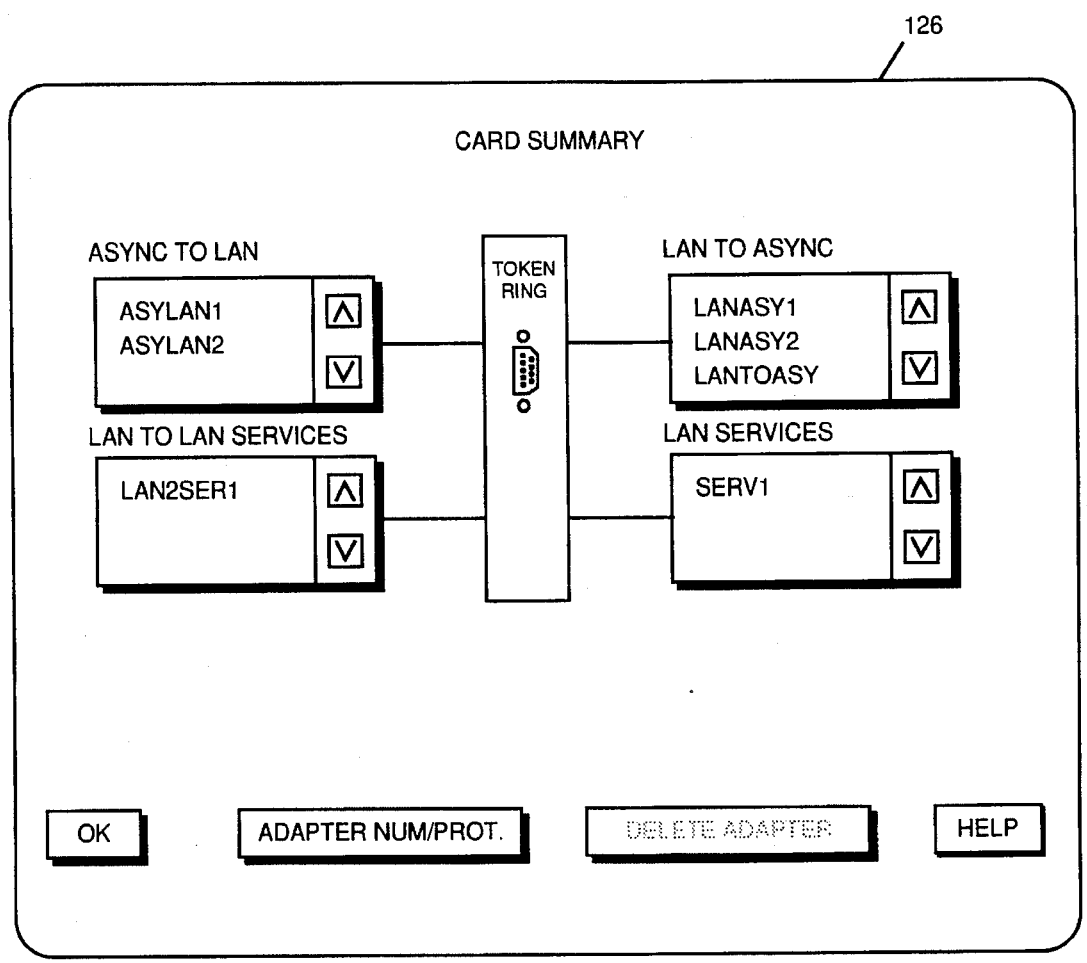
Figure 13:
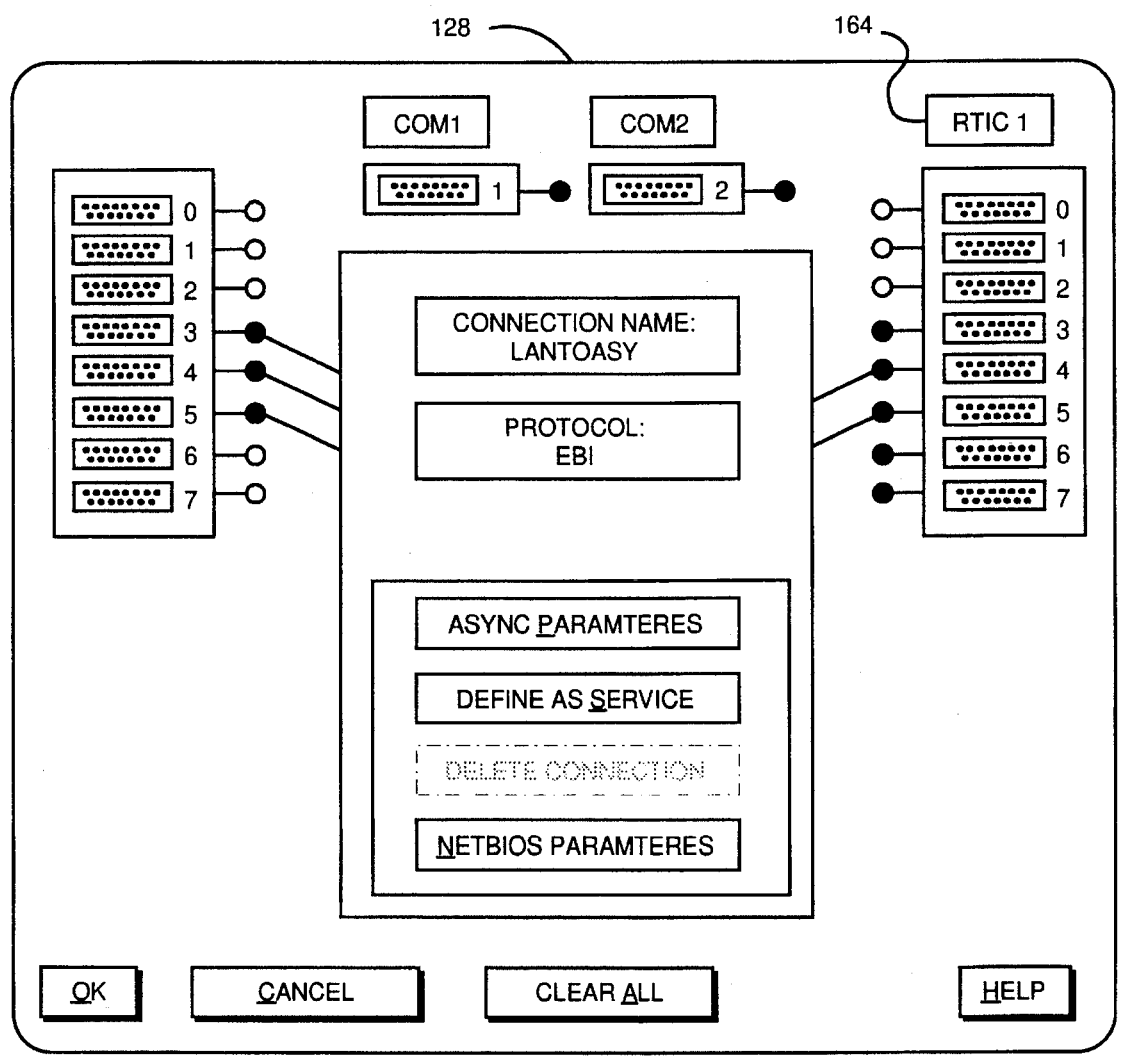
Figure 14:
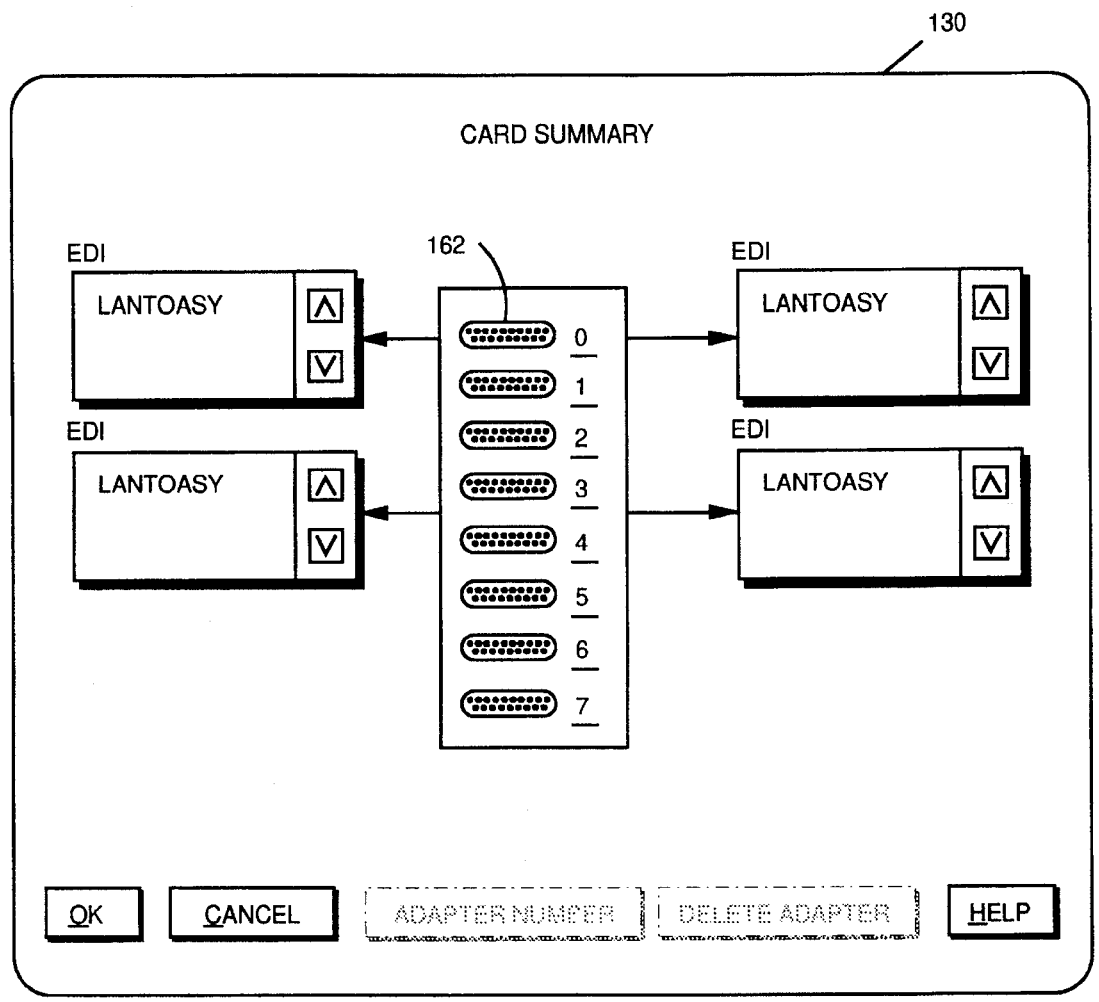
Figure 15:
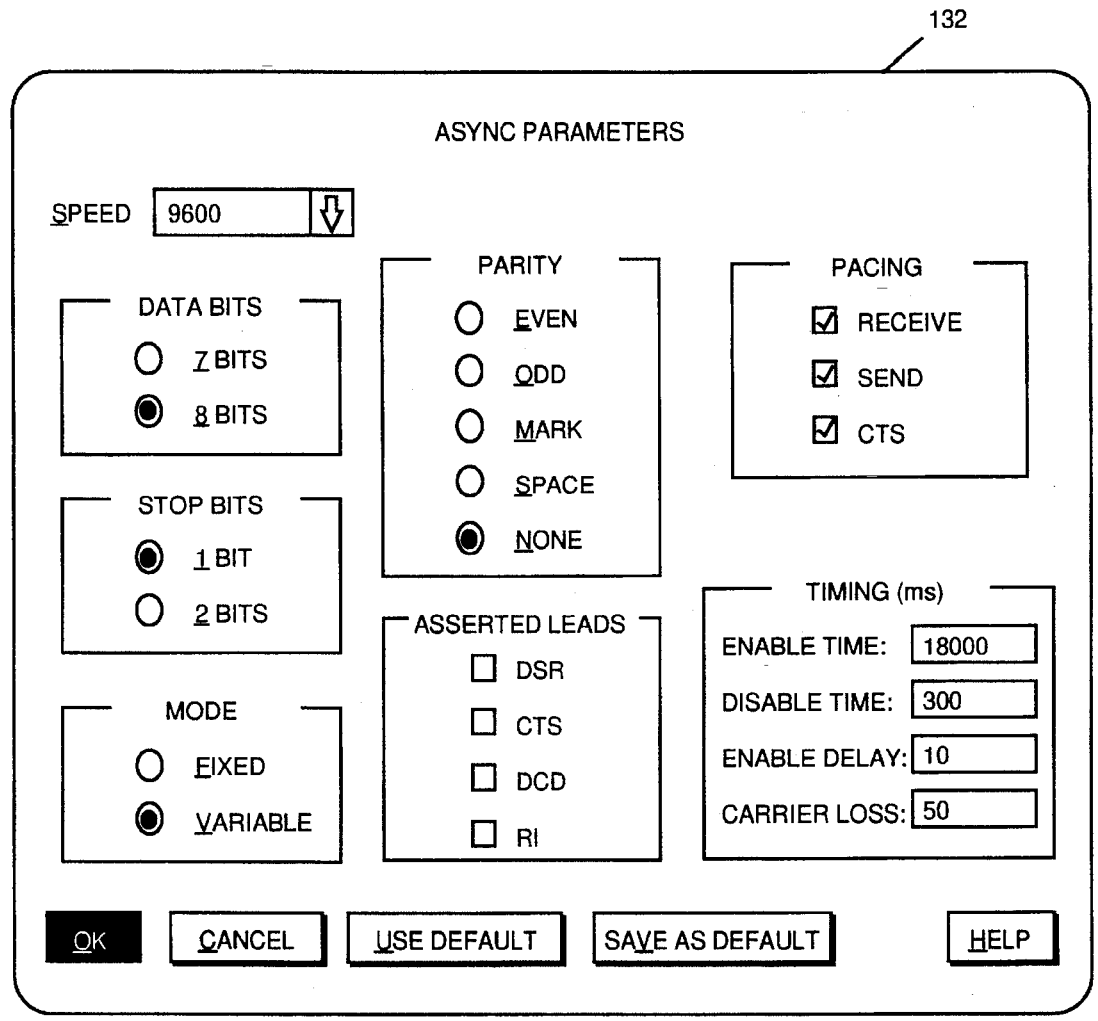
Figure 16:
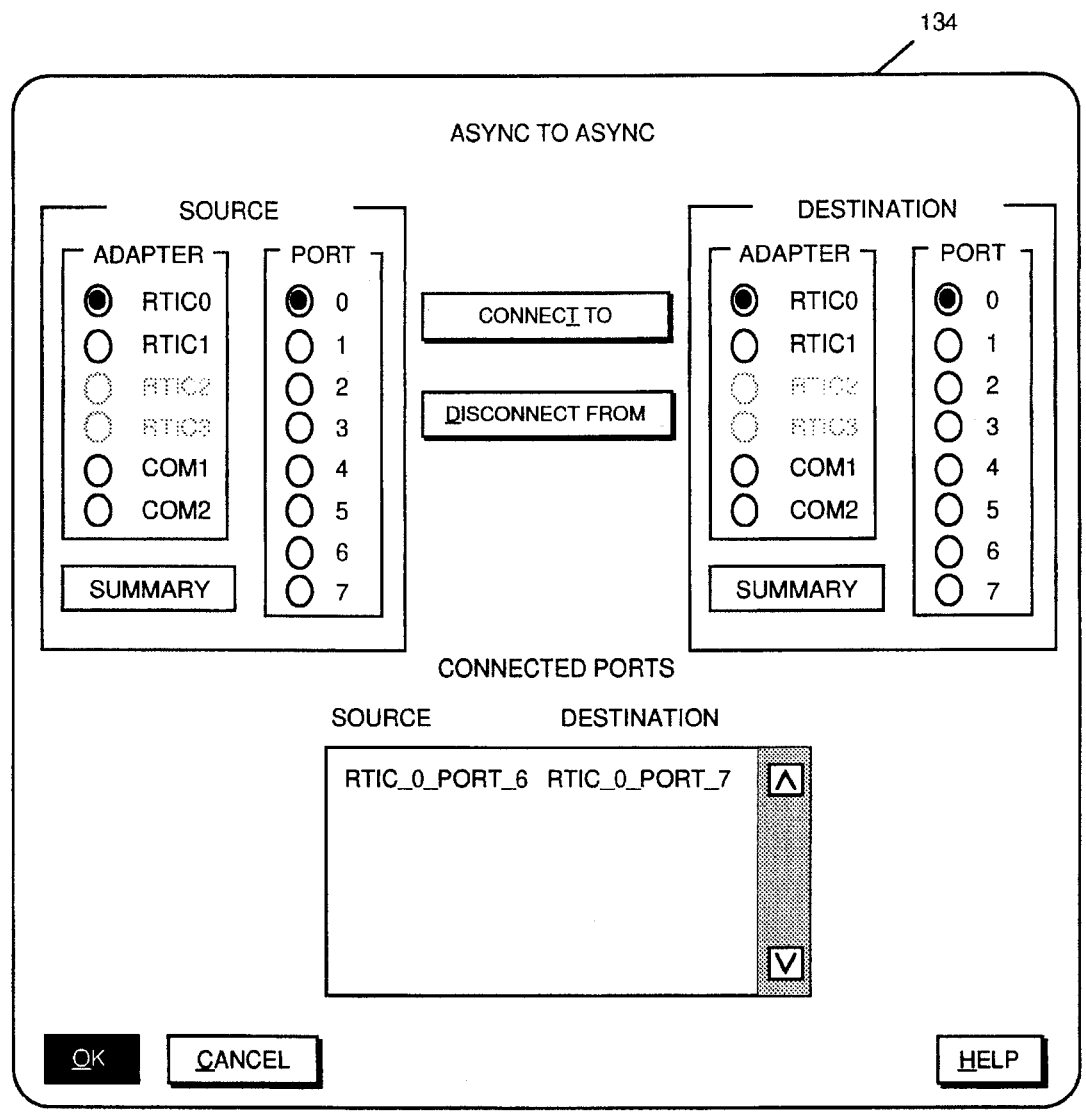

Refer next to FIGS. 8–16, wherein there is illustrated in greater detail the logic of the operations performed in assembling the configuration program of the second embodiment of the display and control system as illustrated in FIG. 5, FIG. 6 and FIG. 7. FIG. 8 illustrates in block diagram form the logical options in constructing the configuration program as required by the LANACS software program. FIGS. 9–16 are sample screens for illustrating the logical flow of the block diagram in FIG. 8. In particular, each of the screens illustrated in FIGS. 9–16 are indicated as blocks in FIG. 8. For example, the screen graphics 120 illustrated in FIG. 9 is indicated by block 120 in FIG. 8A. Similarly, the screen graphics 122 shown in FIG. 10 is indicated by block 122 in FIG. 8A. Likewise, the screen graphics 124 and 126 of FIGS. 11 and 12 are represented by blocks 124 and 126 of FIG. 8B. Screen graphics 128, 130 and 132 of FIGS. 13, 14 and 15 are indicated by blocks 128, 130 and 132, respectively, of FIG. 8C. Finally, screen graphics 134 of FIG. 16 is represented by block 134 of FIG. 8D. The diamond-shaped boxes within the blocks representing the screens represent user-options when the screen is displayed. The direction boxes having a single letter therein represent a change in the particular screen graphics, the letter positioned therein indicating the particular "next" screen.

As indicated by oval 136 of FIG. 8A, the program begins at screen graphics 120 of FIG. 9, or the "CONNECTIONS SETUP". The user then selects "HARDWARE SETUP" 138, "OUTGOING ASYNC" 140, or "INCOMING ASYNC" 142. Within the OUTGOING ASYNC box 140 are two selections: (1) an asynchronous ("async") to async connection ("DIRECT" 140A); and (2) a local area network (LAN) to async ("LANTOASY" 140B). Similarly, within the INCOMING ASYNC box 142 are two selections: (1) an asynchronous ("async") to async connection ("DIRECT" 142B); and (2) an async to LAN connection ("ASYLAN1" 142A). As discussed above, the user may maneuver the cursor via a mouse or via the keyboard. If the HARDWARE SETUP 138 is selected, screen graphics 124 of FIG. 11 is displayed as indicated by direction box 146 shown in FIGS. 8A and 8B. If an async to LAN connection is selected, for example, LANTOASY 140B, screen graphics 128 of FIG. 13 is displayed as indicated by direction box 148 illustrated in FIGS. 8A and 8C. If an async to async connection is selected, such as ASYLAN1 142A, screen graphics 134 of FIG. 16 is displayed as indicated by direction box 150 illustrated in FIGS. 8A and 8D. Finally, if ADD NEW CONNECTION 144 is selected, screen graphics 122 of FIG. 10 is displayed as indicated in FIG. 8A.

As indicated above, if HARDWARE SETUP 138 is selected, screen graphics 124 of FIG. 11 is displayed. Screen graphics 124 depicts the actual hardware visual image of the back of the personal computer selected (in this case, IBM PS/2 Model 80). The hardware view of the personal computer and its associated slots immediately demonstrates to the user the maximum number of interface cards possible (in this case, seven), the number currently configured (in this case, seven), as well as the installed card types. As indicated in FIG. 8B, the user may choose the "CONNECTIONS SETUP" 152, a LAN adapter 154, for example Token Ring card #0 (T/R #0), or an RTIC adapter card 156, for example, RTIC card #1. If the user selects CONNECTIONS SETUP 152, screen graphics 120 of FIG. 9 is displayed as indicated by direction box 158 of FIGS. 8A and 8B. The user's selections from screen graphics 120 was discussed above. If LAN adapter card 154 is selected, screen graphics 126 of FIG. 12 is displayed as shown in FIG. 8B. Finally, if RTIC adapter card 156 is selected, screen graphics 130 of FIG. 14 is displayed as indicated by direction box 160 shown in FIGS. 8B and 8C.

From screen graphics 130 in FIG. 14, the user may select an individual port 162 of the adapter card. In this case, Port #0 is selected as an example. When individual port 162 is selected, screen graphics 132 of FIG. 15, illustrating the selectable async port parameters, is displayed as indicated in FIG. 8C.

Referring again to FIG. 8A, if the user selects a LAN to async connection 140B from OUTGOING ASYNC 140, screen graphics 128 of FIG. 13 is displayed. This is indicated by direction block 148 in FIGS. 8A and 8C. From screen graphics 128, the user may choose one of the async adapters present, in this case, RTIC Card #0 or RTIC Card #1. As an example, RTIC Card #1, indicated by the numeral 164 is selected. Upon selecting async adapter 164 (RTIC Card #1), screen graphics 130 of FIG. 14 is displayed. This is shown in FIG. 8C. The user's selections from screen graphics 130 was discussed above.

If, from the CONNECTIONS SETUP screen 120, the user selects an async to async connection ("DIRECT" 142B), screen graphics 134 of FIG. 16 is displayed. This is indicated by direction box 150 illustrated in FIGS. 8A and 8D.

Finally, if, from the CONNECTIONS SETUP screen 120, the user selects ADD NEW CONNECTION 144, screen graphics 122 of FIG. 10 is displayed as indicated in FIG. 8A. From screen graphics 122, the user may specify a connection type, such as an async to LAN connection 140B or an async to async connection 142B. These user selections were discussed above.

Although the present invention has been described in the context of the preferred embodiment, it will be readily apparent to those skilled in the programming art that modifications and variations can be made therein without departing from the scope of the invention as defined in the claims.

What is claimed is:

1. For use with a first networking component in a communications network having a plurality of networking components wherein data may be conveyed between said networking components in said communications network, said first networking component having a primary function of passing data to and from said communications network and having a configurable relationship with other networking components so that a communication link may exist between said first networking component and another networking component so that data may be conveyed over said communication link, and wherein said communication link may be starting between said first networking component and another networking component in that communication activity is initializing between said first networking component and said another networking component, a display and control system for monitoring and configuring said first networking component with respect to the communications activity with the remainder of said communications network, said display and control system comprising:

a plurality of icons for selectively representing said first networking component and said other networking components;

a screen for displaying said plurality of icons, said screen having a matrix of display elements for producing a display image, said matrix comprising a plurality of columns and rows of said display elements;

a predefined array of areas on said screen defining a plurality of locations for said icons to be positioned, each icon having a predetermined location in said array, said predefined array of areas comprising a plurality of columns and rows, each column and row of said predefined array of areas comprising a plurality of columns and rows of said display elements;

control means for defining and establishing a relationship solely between said first networking component and said other networking components; and means for indicating on said screen the status of relationships solely between said fast networking component and said other networking components comprising means for indicating that said communication link is starting.

2. The display and control system defined in claim 1 wherein said communication link is either automatically established by said control means or manually established by a user of said display and control system, said indicating means further comprising means for indicating whether said communication link is automatically or manually established.

3. The display and control system defined in claim 2 wherein said indicating means further comprising a solid line for indicating that said communication link is automatically established and a broken line for indicating that said communication link is manually established.

4. The display and control system defined in claim 3 wherein said indicating means further comprises a half line growing from no line and further growing to a full line for indicating that said communication link is starting.

5. The display and control system defined in claim 1 wherein said communication link may be stopping between said first networking component and another networking component in that communication activity is being deactivated between said first networking component and said another networking component, said indicating means further comprising means for indicating that said communication link is stopping.

6. The display and control system defined in claim 5 wherein said indicating memos further comprises a full line shrinking to a half line and further shrinking to no line for indicating that said communication link is stopping.

7. The display and control system defined in claim 1 wherein said indicating means further comprises means for indicating solely the status of relationships in real-time between a first icon representing said first networking component and all other icons representing the other networking components.

8. The display and control system defined in claim 7 wherein said first icon is positioned in the center of said screen.

9. The display and control system defined in claim 1 wherein said communication link is either physical or logical, said indicating means further comprising means for indicating whether said communication link is physical or logicial.

10. The display and control system defined in claim 9 wherein said indicating means further comprises a black line for indicating that said communication link is physical and a blue line for indicating that said link is logical.

11. An interconnect device for being connected between a first network and a second network of a plurality of networks, said interconnect device comprising means for passing data from said first network to said second network and further comprising a display and control system for monitoring and configuring a complex system having a plurality of other interconnect devices, said interconnect device having a configurable relationship with said other interconnect devices so that a communication link may exist between said interconnect device and said other interconnect devices, and wherein said communication link may be starting between said interconnect device and another interconnect device in that communication activity is initializing between said interconnect device and said another interconnect device, said display and control system comprising a plurality of icons for selectively representing said interconnect device and said plurality of other interconnect devices, a screen for displaying said plurality of icons, said screen having a matrix of display elements for producing a display image, said matrix comprising a plurality of columns and rows of said display elements, a predetermined array of areas on said screen defining a plurality of locations for said icons to be positioned, each icon having a predetermined location in said array, said predefined array of areas comprising a plurality of columns and rows, each column and row of said predefined army of areas comprising a plurality of columns and rows of said display elements, control means for defining and establishing a relationship solely between said interconnect device and said other interconnect devices, and means for indicating on said screen the status of relationships solely between said interconnect device and said other interconnect devices, said indicating means comprising means for indicating that said communication link is starting.

12. The interconnect device defined in claim 11 wherein said communication link is either automatically established by said control means or manually established by a user of said display and control system, said indicating means further comprising means for indicating whether said communication link is automatically or manually established.

13. The interconnect device defined in claim 12 wherein said indicating means further comprising a solid line for indicating that said communication link is automatically established and a broken line for indicating that said communication link is manually established.

14. The interconnect device defined in claim 13 wherein said indicating means further comprises a half line growing from no line and further growing to a full line for indicating that said communication link is starting.

15. The interconnect device defined in claim 11 wherein said communication link may be stopping between said interconnect device and another interconnect device in that communication activity is being deactivated between said interconnect device and said another interconnect device, said indicating means further comprising means for indicating that said communication link is stopping.

16. The interconnect device defined in claim 15 wherein said indicating means further comprises a full line shrinking to a half line and further shrinking to no line for indicating that said communication link is stopping.

17. The interconnect device defined in claim 11 wherein said indicating means further comprises means for indicating solely the status of relationships in real-time between a first icon representing said interconnect device and all other icons representing the other interconnect devices.

18. The interconnect device defined in claim 17 wherein said first icon is positioned in the center of said screen.

19. The interconnect device defined in claim 11 wherein said communication link is either physical or logical, said indicating means further comprising means for indicating whether said communication link is physical or logicial.

20. The interconnect device defined in claim 19 wherein said indicating means further comprises a black line for indicating that said communication link is physical and a blue line for indicating that said link is logical.

\* \* \* \* \*